(12) United States Patent
Far

(10) Patent No.: US 10,411,597 B1
(45) Date of Patent: Sep. 10, 2019

(54) ULTRA-LOW POWER AND ULTRA-LOW VOLTAGE BANDGAP VOLTAGE REGULATOR DEVICE AND METHOD THEREOF

(71) Applicant: Ali Tasdighi Far, Saratoga, CA (US)

(72) Inventor: Ali Tasdighi Far, Saratoga, CA (US)

( * ) Notice: Subject to any disclaimer, the term of this patent is extended or adjusted under 35 U.S.C. 154(b) by 3 days.

(21) Appl. No.: 15/721,463

(22) Filed: Sep. 29, 2017

Related U.S. Application Data

(63) Continuation of application No. 14/163,659, filed on Jan. 24, 2014, now Pat. No. 9,780,652.

(60) Provisional application No. 61/756,490, filed on Jan. 25, 2013, provisional application No. 61/756,490, filed on Aug. 31, 2013.

(51) Int. Cl.
  *G05F 3/08* (2006.01)
  *G05F 3/16* (2006.01)
  *H02M 3/158* (2006.01)

(52) U.S. Cl.
  CPC .............. *H02M 3/158* (2013.01); *G05F 3/08* (2013.01); *G05F 3/16* (2013.01)

(58) Field of Classification Search
  CPC ......................................................... G05F 3/16
  See application file for complete search history.

(56) References Cited

U.S. PATENT DOCUMENTS

| | | |
|---|---|---|
| 4,677,369 A | 6/1987 | Bowers et al. |
| 5,283,579 A | 2/1994 | Tasdighi et al. |
| 5,294,927 A | 3/1994 | Levinson et al. |
| 5,640,084 A | 6/1997 | Tero et al. |
| 5,668,710 A | 9/1997 | Caliboso et al. |
| 5,734,260 A | 3/1998 | Tasdighi et al. |
| 5,734,291 A | 3/1998 | Tasdighi et al. |

(Continued)

OTHER PUBLICATIONS

Annerna, A. J., (1999), "Low-power bandgap references featuring DTMOSTs," IEEE JSSC, 34(2), 949-955.

(Continued)

*Primary Examiner* — Jue Zhang
*Assistant Examiner* — Trinh Q Dang
(74) *Attorney, Agent, or Firm* — Roark IP

(57) ABSTRACT

A family of bandgap embodiments are disclosed herein, capable of operating with very low currents and low power supply voltages, using neither any custom devices nor any special manufacturing technology, and fabricated on mainstream standard digital CMOS processes. As such, manufacturing cost can be kept low, manufacturing yields of digital CMOS system-on-a-chip (SOC) that require a reference can be kept optimal, and manufacturing risk can be minimized due to its flexibility with respect to fabrication process node-portability. Although the embodiments disclosed herein use novel techniques to achieve accurate operations with low power and low voltage, this family of bandgaps also uses parasitic bipolar junction transistors (BJT) available in low cost digital CMOS process to generate proportional and complementary to absolute temperature (PTAT and CTAT) voltages via the base-emitter voltage ($V_{EB}$) of BJTs and scaling $V_{EB}$ differential pairs to generate the BJTs thermal voltage ($V_T$).

1 Claim, 5 Drawing Sheets

(56) References Cited

U.S. PATENT DOCUMENTS

| | | | |
|---|---|---|---|
| 5,814,995 | A | 9/1998 | Tasdighi |
| 5,923,208 | A | 7/1999 | Tasdighi et al. |
| 6,005,374 | A | 12/1999 | Tasdighi |
| 6,054,823 | A | 4/2000 | Collings et al. |
| 6,122,284 | A | 9/2000 | Tasdighi et al. |
| 6,281,743 | B1 | 8/2001 | Doyle |
| 6,366,071 | B1 | 4/2002 | Yu |
| 6,489,831 | B1 | 12/2002 | Matranga |
| 6,657,480 | B2 | 12/2003 | Ochi |
| 6,885,178 | B2 | 4/2005 | Marinca |
| 7,078,958 | B2 | 7/2006 | Gower et al. |
| 7,193,454 | B1 | 3/2007 | Marinca |
| 7,211,993 | B2 | 5/2007 | Marinca |
| 7,612,606 | B2 | 11/2009 | Marinca |
| 9,519,304 | B1 | 12/2016 | Far |
| 9,780,652 | B1 | 10/2017 | Far |
| 9,921,600 | B1 | 3/2018 | Far |
| 2002/0093325 | A1 | 1/2002 | Ju |
| 2004/0124822 | A1 | 7/2004 | Marinca |
| 2005/0254345 | A1 | 12/2005 | Ker |
| 2005/0285666 | A1 | 12/2005 | Garlapati |
| 2006/0132223 | A1 | 6/2006 | Cherek |
| 2007/0052473 | A1 | 3/2007 | McLeod |
| 2007/0076483 | A1 | 4/2007 | Colman |
| 2007/0132506 | A1 | 6/2007 | Fujisawa |
| 2008/0018316 | A1* | 1/2008 | Chang ................ G05F 3/30 323/313 |
| 2008/0224682 | A1 | 9/2008 | Haiplik |
| 2008/0278137 | A1 | 11/2008 | Harvey |
| 2010/0237926 | A1 | 9/2010 | Kikuta et al. |
| 2011/0025666 | A1 | 2/2011 | Baek et al. |
| 2011/0068767 | A1 | 3/2011 | Carper |
| 2012/0169413 | A1* | 7/2012 | Choi ................ G05F 3/30 327/539 |
| 2012/0176186 | A1 | 7/2012 | Chen |

OTHER PUBLICATIONS

Banba, H. et al. (1999), A CMOS bandgap reference circuit with sub 1-V operation. IEEE, JSSC, 34(5), 670-674.

Boni, A., (2002), "Op-amps and startup circuits for CMOS bandgap with near 1-V supply", IEEE JSSC, 37(10), 1339-1343.

Buck A et al, (2002). "A CMOS bandgap reference without resistors", IEEE JSSC.

Doyle, J. et al, (2004), "A CMOS suh-bandgap reference circuit with 1-V power supply voltage", IEEE JSSC, 39(1), 252-255.

Ferro et al. (1989), "A floating CMOS bandgap voltage reference for differential application," IEEE .JSSC, 24(1), 690-697.

Giustolisi, G. et ai, (2003), "A low-voltage low-power voltage reference based on subthreshold"_ IEEE JSSC, 38(1), 151-154.

Jiang, Y. et al. (2000), "Design of low-voltage bandgap reference using transimpedance amplifier". IEEE TCS II 47(6), 552-555.

Jiang, Y. et al, (2005), "A low voltage low 1/f noise CMOS bandgap reference". IEEE ISCS, 4(1), 3877-3880.

Leung, K. N. et al, (2002), "A sub-1-V 15-ppm/C CMOS bandgap reference without requiring low threshold" IEEE JSSC, 37(4).

Malcovati, P et al, (2001), "Curvature-compensated BiCMOS bandgap with 1-V supply voltage." IEEE JSSC, 36, 1076-1081.

Meijer, G. M. et al, (1982), "A new curvature-corrected band gap reference", IEEE JSSC, 17(6), 1139-1143.

Neuteboom, H. et al, (1997), "A DSP-based hearing instrument IC". IEEE JSSC, 32, 1790-1806.

Oguey H. J. et al, (1977), "CMOS Current Reference without Resistance", IEEE JSSC, vol. 32(1), 1132-1135.

Ueno, K. et al, (2009), A 300nW, 15 ppm/C, 20ppm/V CMOS Voltage Reference Subthreshold MOSFETs IEEE JSSC, 44(7).

Vittoz, E et al, (1979), "A Low VblFage GMOS Bandgap Reference", IEEE JSSC.

A. Far, "Smell size class AB amplifier for energy harvesting with ultra low power, high gain, and high CMRR," 2016 IEEE International Autumn Meeting on Power, Electronics and Computing (ROPEC), Ixtapa, 2016, pp. 1-5.

A. Far, "Compact ultra low power class AB buffer amplifier," 2017 IEEE International Autumn Meeting on Power, Electronics and Computing (ROPEC), Ixtapa, 2017, pp. 1-6.

A. Far, "Subthreshold current reference suitable for energy harvesting: 20ppm/C and 0.1%/V at 140nW," 2015 IEEE International Autumn Meeting on Power, Electronics and Computing (ROPEC), Ixtapa, 2015, pp. 1-4.

A. Far, "Amplifier for energy harvesting: Low voltage, ultra low current, rail-to-rail input-output, high speed," 2016 IEEE International Autumn Meeting on Power, Electronics and Computing (ROPEC), Ixtapa, 2016, pp. 1-6.

A. Far, "Class AB amplifier with noise reduction, speed boost, gain enhancement, and ultra low power," 2018 IEEE 9th Latin American Symposium on Circuits & Systems (LASCAS), Puerto Vallarta, Mexico, 2018, pp. 1-4.

A. Far, "Low noise rail-to-rail amplifier runs fast at ultra low currents and targets energy harvesting," 2017 IEEE International Autumn Meeting on Power, Electronics and Computing (ROPEC), Ixtapa, 2017, pp. 1-6.

A. Far, "A 5µW fractional CMOS bandgap voltage and current reference," 2013 IEEE Global High Tech Congress on Electronics, Shenzhen, 2013, pp. 7-11.

A. Far, "A 400nW CMOS bandgap voltage reference," 2013 International Conference on Electrical, Electronics and System Engineering (ICEESE), Kuala Lumpur, 2013, pp. 15-20.

A. Far, "Enhanced gain, low voltage, rail-to-rail buffer amplifier suitable for energy harvesting," 2017 IEEE International Autumn Meeting on Power, Electronics and Computing (ROPEC), Ixtapa, 2017, pp. 1-6.

A. Far, "Subthreshold bandgap voltage reference aiming for energy harvesting: 100na, 5 ppm/c, 40 ppm/v, psrr-88db," 2015 IEEE 5th International Conference on Consumer Electronics—Berlin (ICCE-Berlin), Berlin, 2015, pp. 310-313.

A. Far, "A 220nA handgap reference with 80dB PSRR targeting energy harvesting," 2016 IEEE Canadian Conference on Electrical and Computer Engineering (CCECE), Vancouver, BC, 2016, pp. 1-4.

A. Far, "Sub-1 volt class AB amplifier with low noise, ultra low power, high-speed, using winner-take-all," 2018 IEEE 9th Latin American Symposium on Circuits & Systems (LASCAS), Puerto Vallarta, Mexico, 2018, pp. 1-4.

A. Far, "A low supply voltage 2µW half bandgap reference in standard sub-µ CMOS," 2014 IEEE International Conference an Electronics, Computing and Communication Technologies (CONECCT), Bangalore, 2014, pp. 1-5.

A. Far, "Current reference for energy harvesting: 50um per side. At 70 nW, regulating to 125C," 2014 IEEE International Autumn Meeting on Power, Electronics and Computing (ROPEC), Ixtapa, 2014, pp. 1-5.

\* cited by examiner

ULTRA-LOW POWER AND ULTRA-LOW VOLTAGE BANDGAP VOLTAGE REGULATOR DEVICE AND METHOD THEREOF

CROSS-REFERENCE TO RELATED PATENT APPLICATIONS

The present invention claims priority from U.S. patent application Ser. No. 14/163,659, filed Jan. 24, 2014; which claims priority from U.S. Provisional Patent Application Ser. No. 61/756,490, filed Jan. 25, 2013 and U.S. Provisional Patent Application Ser. No. 61/865,559, filed Aug. 13, 2013; all of which are herein specifically incorporated by reference in their entirety.

FIELD OF THE INVENTION

This invention relates to improvements in voltage regulators for integrated circuits.

BACKGROUND

Voltage regulators are fundamental functions in powering most analog or digital functions in electronic systems. Operating at low currents, low power supply voltages, and over extended temperatures are key objectives in portable electronics systems, including in system-on-chips (SOC), especially in medical or emerging wireless and battery-less applications such as power-on-a-chip (PoC), Internet-of-things (IoT), or energy harvesting, to name a few.

In light of the potentially large markets for such emerging applications, unless solution costs are low, the markets may not realize their full potential reach. As such, low cost innovations in component designs are needed to enable such prospects of high volume markets to get off the ground and take off. In the last few decades, there has been a tremendous amount of annual manufacturing investment in semiconductors, some of which is sunk-cost. As a result, there is likely ample capacity in standard complementary metal-oxide-semiconductor (CMOS) manufacturing factories that may be readily and cheaply available for exploitation by new and promising high volume markets. The enablement of such new high volume markets would greatly benefit if their solutions require neither any custom devices nor any special processes, which could impose higher costs or risks on manufacturing yields. For design solutions in such emerging applications, to optimally exploit the existing digital CMOS capacity, manufacturing process node-portability should not be impeded. While the die-size of such solutions need to be kept small to keep the costs down, optimally no performance interference on the rest of the functions of the SOC should be imposed by innovative designs when serving such new applications requirements (low voltage and ultra-low current over maximal power supply and temperature spans).

A survey of alternative voltage regulator topologies is presented in Fayomi, C J B. et al (2010) "Sub 1 V CMOS bandgap reference design techniques: a survey", AICSP 62:141-157, DOI 10.1007/s10470-009-9352-4 discusses many techniques and their trade-offs for low power references and which is hereby incorporated by reference. Some of the trade-offs which are discussed in Fayomi et al. are briefly summarized as follows. Using Bipolar CMOS (BiCMOS) processes or depletion mode CMOS transistors frees up some operational supply headroom but adds to fabrication complexity and cost. Also, utilizing process deviations such as threshold differentials between positive channel metal-oxide semiconductors (PMOS) and negative channel metal-oxide semiconductors (NMOS), multiple depletion mode transistors, and differential thresholds via channel length variations. Alternatively, using custom devices such as a dynamic threshold metal-oxide semiconductor transistor (DTMOST), bulk driven CMOS, or lateral positive negative positive transistors (PNPs) can provide some design flexibility in extending digital power supply voltage ($V_{DD}$) and bandgap voltage ($V_{BG}$) spans, but at a price. Such deviations impose additional manufacturing costs, require special device modeling, or may demand post production control monitoring for the entire SOC that contains the reference. There are other design techniques, such as switch capacitors, that can provide extra operational headroom without the need for process or device variations. Switching techniques can help make low-noise references with stable temperature coefficients (TC) but may add cost due to capacitor extra mask or large capacitors for low droop rates. Chopping bandgap topologies can also cause high transient current consumption or may interfere with other substrate-noise sensitive analog functions within the SOC. Moreover, switch capacitor topologies can increase latch up risk and may require on chip charge-pumps in sub-1V environments. Banking only on CMOS transistors in subthreshold (which emulate pseudo-bipolar junction transistor (BJT) like behavior) to generate a $V_{BG}$ helps with low-power and sub-1V objectives, but such designs generally exhibit wider $V_{BG}$ variations, and likely require extra trimming and testing cost in post production. Forward biasing PMOS or NMOS body-source terminals can help increase bandgap amplifier headroom, but requires proper modeling at different process nodes. Additionally, such a design approach generally entails increased parasitic current and leakage risk at elevated temperatures, which limits the reference high temperature operations. The majority of reference topologies that impose on the SOC by requiring special processes or rely on non-standard use of transistors have not made it to high-volume applications. This is not just because of their added manufacturing cost, special device characterization, or special device modeling requirements. As noted earlier, variations on process, and deviation on devices for one function of an SOC (such as a reference) increases costs and manufacturing risk on the entire SOC and handicaps the SOC's process node portability, which ties the manufacturer's hands.

SUMMARY OF THE INVENTION

An aspect of the disclosure herein is a fractional bandgap reference circuit comprising: a voltage loop having two scaled transistors to provide a positive TC signal across a first resistor; a feedback loop having a first amplifier which generates a positive TC signal across a second resistor and a third resistor; a second amplifier controlling a plurality of current sources which conjunctively produce the residual signal with near zero TC to the feedback loop to produce a voltage reference across a fourth resistor; and wherein the voltage loop positive TC signal is supplied by the positive TC signal of the feedback loop to generate the residual signal with near zero TC.

Another aspect of the disclosure herein is a method of creating a fractional bandgap comprising: providing a positive TC signal across a first resistor from a voltage loop having two scaled transistors; generating a positive TC signal from a feedback loop having a first amplifier across a second resistor and a third resistor; controlling a plurality of current sources by a second amplifier to conjunctively produce a residual signal with near zero TC to the feedback loop to produce a voltage reference across a fourth resistor; and generating the residual signal with near zero TC by supplying the voltage loop positive TC signal from the positive TC signal of the feedback loop.

Another aspect of the disclosure herein is a fractional bandgap reference circuit comprising: a voltage loop having a first transistor and second transistor isolated by a first amplifier from a first resistor and which creates a positive TC current and a negative TC voltage; a second amplifier in conjunction with a plurality of current sources to receive the positive TC current from the voltage loop and supply a feedback loop with a positive TC signal; and the feedback loop having a scaled second resistor and third resistor which receive the positive TC current, which is fed to a second and a third resistors to produce a positive TC voltage that is combined with the negative TC voltage to generate a near zero TC voltage as a reference voltage.

Another aspect of the disclosure herein is a method of generating a fractional bandgap comprising: isolating a voltage loop having a first transistor and second transistor by a first amplifier from a first resistor, wherein the voltage loop creates a positive TC current and a negative TC voltage; receiving the positive TC current at an amplifier and conjunctively with a plurality of current sources to supply feedback loop with a positive TC signal; and receiving the positive TC signal at the feedback loop which includes a scaled second resistor and third resistor and which feeds a positive TC current to a second resistor and a third resistor to produce a positive TC voltage that is combined with the negative TC voltage to generate a near zero TC voltage as a reference voltage.

Another aspect of the disclosure herein is a fractional bandgap reference circuit comprising: a voltage loop having a first transistor, a second transistor, first amplifier and a first resistor; said first resistor connected to the base of the first transistor to isolate a quiescent current of the first transistor from the current through the first transistor to generate a positive TC current; and said first amplifier buffering a negative TC voltage between the voltage loop and a feedback loop; a second amplifier in conjunction with a plurality of current sources which receives a positive TC current that was generated by the voltage loop and supplies feedback loop with a positive TC signal; and the feedback loop having a scaled second resistor and third resistor which receive the positive TC current, which is fed into the second and the third resistors to generate a positive TC voltages that is combined with the negative TC voltage to generate a near zero TC voltage as a reference voltage.

Another aspect of the disclosure herein is a bandgap reference circuit comprising: a plurality of $V_T$ cells connected in series to produce a $V_{PTAT}$; wherein each of said $V_T$ cells comprise a first amplifier and scaled first transistor and second transistor operating at scaled currents which are biased by the two scaled current sources; said first amplifier generating a positive TC output voltage at a base of the first transistor so that the amplifier inputs are substantially equalized; a $V_{EB}$ transistor biased by a current source to generate a $V_{CTAT}$; and wherein the $V_{PTAT}$ and $V_{CTAT}$ are connected in series to create a voltage reference.

Another aspect of the disclosure herein is a method of producing a bandgap reference comprising: producing a $V_{PTAT}$ from a plurality of $V_T$ cells connected in series; wherein each of said $V_T$ cells comprise a first amplifier and scaled first transistor and second transistor operating at scaled currents which are biased by at least two scaled $V_T$ cell current sources; said first amplifier generating a positive TC output voltage at a base of the first transistor so that the amplifier inputs are substantially equalized; biasing a $V_{EB}$ transistor by a current source to generate a $V_{CTAT}$; and creating a voltage reference from the $V_{PTAT}$ and the $V_{CTAT}$.

DETAILED DESCRIPTION

Figure 1:
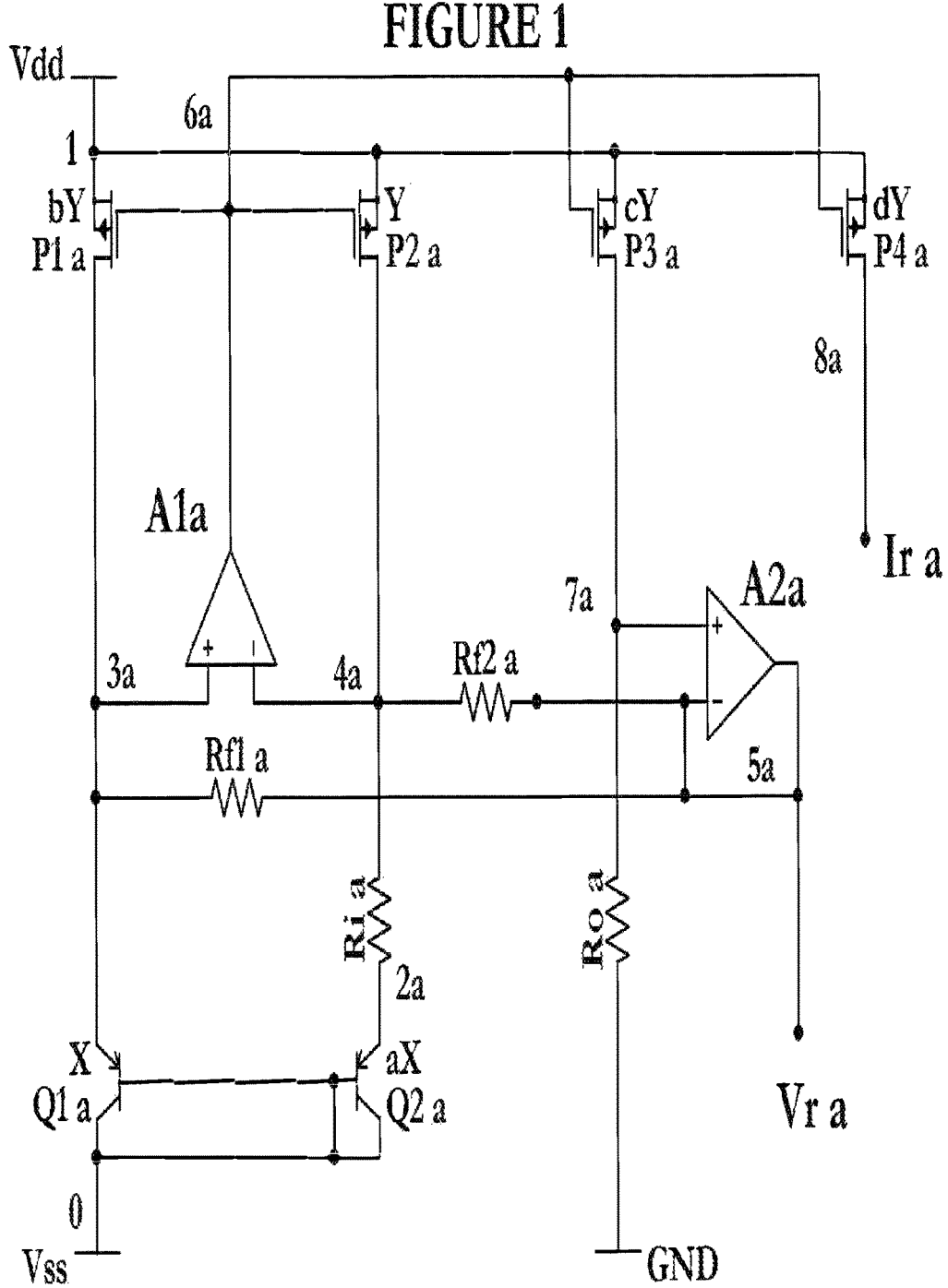
FIG. 1 is a schematic circuit diagram of a first embodiment illustrating a bandgap (or fractional bandgap) in a voltage regulator circuit.

Numerous embodiments are described in the present application and are presented for illustrative purposes only. The described embodiments are not, and are not intended to be, limiting in any sense. One of ordinary skill in the art will recognize that the disclosed embodiment(s) may be practiced with various modifications and alterations, such as structural, logical, and electrical modifications. Although particular features of the disclosed embodiments may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features which must necessarily be present in all embodiments On the contrary, a variety of components are described to illustrate the wide variety of possible embodiments of the present invention(s).

Although process (or method) steps may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps.

Although a circuit may be described as including a plurality of components, aspects, steps, qualities, characteristics and/or features, that does not indicate that any or all of the plurality are preferred, essential or required. Various other embodiments may include other circuit elements or limitations that omit some or all of the described plurality.

The following description has been presented for purposes of illustration and description and is not intended to be exhaustive or to limit the embodiments to the precise form disclosed. Many modifications and variations are possible in light of the teachings disclosed herein. The embodiments were chosen and described to explain principles of operation and their practical applications. However, the scope of the invention is to be defined by the claims.

As mentioned earlier, over the last few decades, multi-billion dollar annual investments in equipment and fabrication technologies have resulted in advancements in low voltage sub-micron CMOS processes that have yielded continued improvements in die density, tightly controlled device parameters {i.e. threshold voltage ($V_{TH}$), Boltzmann Constant (k), oxide thickness ($T_{ox}$), and other parameters}, and increased matching. Naturally, such manufacturing advancements have materially helped enhance the performance, precision, and matching of analog functions (i.e., conventional 2-stage amplifiers with lower offset, lower offset drift, and tighter matching) which is leveraged in the disclosure herein. The embodiments described in this application may be implemented using standard digital CMOS processes and parasitic vertical BJTs with inherent predictability due to the stable device physics base-emitter voltage ($V_{BE}$) and $V_T$ parameters that should enhance manufacturing viability and ease design portability. The majority of transistors used in the bandgap family operate in the sub-threshold region to accommodate their low power objective and help with headroom without use of any custom devices. Additional analysis of relevant to low power and low cost bandgap designs are also hereby incorporated by reference: 1) Ali Far, (2013), "A 5 µW Fractional CMOS Bandgap Voltage and Current Reference", 2013 IEEE GHTCE Conference Proceedings, China; 2) Ali Far, (2013), "A 400 nW CMOS Bandgap Voltage Reference", 2013 IEEE ICEESE Conference Proceedings, Malaysia.; and 3) Ali Far, (2014), "A Low Supply Voltage 2 ρW Half Bandgap Reference In Standard Sub-p CMOS", 2014 IEEE CONNECT Conference Proceedings, India.

The term "near zero" is used throughout this disclosure and hereby a brief explanation is provided as follows. A bandgap voltage, or a fractional bandgap voltage, generally is a voltage that has near zero temperature coefficient (TC). For example for a bandgap reference to have a near zero TC, the output reference voltage can be about 1.2V with variations for instance in the range of +/−10 mV over a span of temperature from negative 50 degrees centigrade to positive 150 degrees centigrade (i.e. 1.99V<VBG<1.21V with −50 C<T<+150 C). Bandgaps without (post manufacturing adjustments or) trim can have wider variations such as for example +/−50 mV or tighter variations of for example +/−1 mV with trim. For a fractional bandgap (say for a half bandgap), an example of near zero TC half bandgap reference voltage could be about 0.6V with variations for instance in the range of +/−5 mV over a span of temperature from negative 50 degrees centigrade to positive 150 degrees centigrade (i.e 0.595V<VHBG<6.05V with −50 C<T<+150 C). Half bandgaps without (post manufacturing adjustments or) trim can have wider variations such as for example +/−25 mV or tighter variations of for example +/−0.5 mV with trim.

In the first embodiment discussed herein a bandgap voltage $V_{BG}$ may be generated by adding (or combining) a proportional to absolute temperature (PTAT) voltage, $V_{PTAT}$, whose voltage increases with temperature (positive TC) to a complementary to absolute temperature (CTAT) voltage, $V_{CTAT}$, whose voltage decrease with temperature (negative TC). Henceforth, summation of the $V_{CTAT}$ (with a negative TC) and $V_{PTAT}$ (with a positive TC) can be scaled via resistors (i.e. resistor dividers) to produce a fractional bandgap voltage, $V_{ra}$, which is substantially constant over temperature variation. This fractional bandgap reference embodiment may be implemented using standard CMOS manufacturing processes, and may not require any custom device or special process, and hence has lower production costs. One of the benefits of these embodiments is that both a fractional current reference $I_{ra}$ and a fractional voltage reference $V_{ra}$ are generated concurrently and low current consumption is optimized around ambient temperature (which is where some applications operate most of the time). This first embodiment includes elements such as amplifiers, resistors, BJTs, and CMOS transistors (i.e. PMOS transistors that can be configured to function as current sources).

FIG. 1 is a circuit schematic showing a bandgap reference according to the first embodiment. Throughout this description the values of $R_{f1a}=R_{f2a}=R_{fa}$ and current source values which are determined as a function of PMOS W/L scale factors may be set to a predetermined value b=c=d=1. Also note that 'b', 'c', and 'd' scale factors may each be in a predetermined range of 1 to 10 depending on considerations such as die size and current consumption amongst others. The current through $R_{ia}$ is a PTAT current where $I_{Ria}$ has a positive TC, comprised of the difference of $V_{EB}$ voltages (between $Q_{1a}$ and $Q_{2a}$) across $R_{ia}$. One terminal of each of $R_{f1a}$ and $R_{f2a}$ is connected to the reference output $V_{ra}$, with near zero TC, while each of $R_{f1a}$ and $R_{f2a}$'s other terminal is connected to a $V_{EB}$ (of $Q_{1a}$ and $Q_{2a}$) potential with a negative TC. As a result, $R_{fa}$'s current $I_{Rfa}$ will increase with temperature. Now $I_{Ria}+I_{Rfa}+I≈0$ in order to meet the requirement that sum of currents at a circuit node must be zero. Since $I_D$ of $P_{3a}=V_{ra}/R_{Oa}=I_{ra}$, then the $I_D$ in $P_{1a}$ through $P_{4a}$ is equal to $I_{ra}$. Moreover, since $I_{Ria}$ increases with temperature and $I_{Rfa}$ supplies $R_{ia}$ with the positive TC current it needs, then the residual $I_{ra}$ is left for the current sources that would be biased with a near zero TC. Therefore, $P_{1a}$ through $P_{4a}$ operate at an $I_D$ that has constant TC that is $I_{ra}$, which generates the fractional voltage reference across $R_{Oa}$ before it is buffered to generate $V_{ra}$.

The connections of the elements in FIG. 1 are described as follows. Transistors $P_{1a}$, $P_{2a}$, $P_{3a}$, and $P_{4a}$ have their source terminals connection to node 1 which is the positive supply voltage or $V_{DD}$. Also, $P_{1a}$ through $P_{4a}$ have their gates connected to node 6a, whose voltage is driven by the output node of amplifier $A_{1a}$. At node 3a, drain of $P_{1a}$ is connected to the emitter of BJT, $Q_{1a}$, as well as the inverting input terminal of amplifier $A_{1a}$. At node 2a, emitter of BJT, $Q_{2a}$, is connected to one terminal of $R_{ia}$. At node 4a, drain of $P_{2a}$ is connected to the other terminal of resistor $R_{ia}$ as well as non-inverting input terminal of $A_{1a}$. Collectors and bases of $Q_{1a}$ and $Q_{2a}$ are connected to $V_{SS}$, which is node 0. At node 7a, drain of $P_{3a}$ is connected to one terminal of resistor $R_{Oa}$ whose other terminal is connected to the ground potential. Also, node 7a is where the fractional bandgap voltage is generated. At node 5a, the inverting input of $A_{2a}$ is connected to its output, which configures $A_{2a}$ as a unity gain amplifier buffer, enabling node 5a which is $V_{ra}$ to substantially equal the voltage at node 7a. Also, the buffered $V_{ra}$ voltage at node 5a is able to drive the common terminal of $R_{f1a}$ and $R_{f2a}$ feedback resistors, whose other terminals are connected to nodes 3a and 4a respectively. Setting the source voltages of transistors $P_{1a}$ through $P_{4a}$ to the same voltage at node 1 and setting their gates to the same voltage at node 6a enables configuring transistors $P_{1a}$ through $P_{4a}$ as four current sources whose quiescent currents can be scaled substantially proportional to their respective transistors' width over length ratios, W/L. Node 8a is the drain of PMOS transistor $P_{4a}$ which operates and provides a reference current source. For example, in the FIG. 1 circuit schematic $(W/L)_{P1a}=b \times (W/L)_{P2a}$, and $(W/L)_{P3a}=c \times (W/L)_{P2a}$, and $(W/L)_{P4a}=d \times (W/L)_{P2a}$, which accommodates scaling PMOS current sources $P_{1a}$, $P_{3a}$, and $P_{4a}$ quiescent currents may be substantially scaled as multiples of 'b', 'c', and 'd' times the quiescent current in $P_{2a}$. In the embodiment described here, b=c=d=1, which causes the quiescent currents in $P_{1a}$ through $P_{4a}$ to be equal (or substantially equal) and the same (or approximately the same) as $I_{ra}$. Also note that 'b', 'c', and 'd' scale factors may each be in a predetermined range of 1 to 10 depending on considerations such as die size and current consumption, amongst others.

The details of various functions of the circuit in FIG. 1 are described in 2 segments.

In the first segment, we begin with the voltage loop that starts (at node 0) going through $V_{BE}$ of $Q_{2a}$ (to node 2a) then through $R_{ia}$ (to node 4a) then across $A_{1a}$ inputs (to node 3a) and finally back through $V_{EB}$ of $Q_{2a}$ to node zero (0). In describing the operation of this voltage loop, amplifiers $A_{1a}$ and $A_{2a}$ have substantially minimal offset voltages. Also, note that $V_{EB}$ of Q is denoted as $V_{EB}|_Q$ and $I_D$ of P is denoted as $I_D|_P$.

$V_{EB}|_{Q1a} \approx I_{Ria} \times R_{ia} + V_{EB}|_{Q2a}$.

Thus: $V_{EB}|_{Q1a} - V_{EB}|_{Q2a} \approx I_{Ria} \times R_{ia} \approx \Delta V_{EB}$.

Therefore, $I_{Ria} \approx \Delta V_{EB}/R_{ia} \approx (V_{EB}|_{Q1a} - V_{EB}|_{Q2a})/R_{ia}$.

To generate $\Delta V_{EB}$, the emitter areas of $Q_{2a}$ are scaled 'a' times bigger than that of $Q_{1a}$, and as described earlier the quiescent currents for $Q_{1a}$ and $Q_{2a}$ can be scaled via $P_{2a}$ and $P_{1a}$ currents, whose W/Ls are scaled by 'b':

$\Delta V_{EB} \approx V_{EB}|_{Q1a} - V_{EB}|_{Q2a} \approx V_T \times \ln(a \times b)$, where $V_T$ is the thermal voltage and equal to $(K \times T)/q$ and k is the Boltzmann constant, q is the electron charge, and T is the temperature. Thus:

$I_{Ria} \approx I_{PTAT} \approx \Delta V_{EB}/R_{ia} \approx V_T \times \ln(a \times b)/R_{ia}$.

Note for example that for a=5 and b=11, then $100\,mV \approx V_T \times \ln(55)$ could be a typical value of $V_T \times \ln(a \times b)$ term in the above equation. Consistent with principles of conventional bandgaps (such as the ones depicted in prior art FIG. 5), note that $\Delta V_{EB}$ tracks $V_T$ which has a positive TC, and this yields the PTAT signal (current) needed in the bandgap.

In the second segment, we turn our attention to the mechanism by which fractional reference current $I_{ra}$ and voltage $V_{ra}$ (with near zero temperature variations) are generated conjunctively. As noted earlier, in this embodiment:

b=c=d=1

$I_D|_{P1a} \approx I_D|_{P2a} \approx I_D|_{P3a} \approx I_D|_{P4a} \approx I_{ra}$.

$R_{f1a} = R_{f2a} = R_{fa}$.

The sum of currents at node 4a and 3a must equal zero. In other words:

$I_D|_{P2a} + I_{Ria} + I_{Rfa} = 0$.

Also, $I_{Rfa} \approx (V_{ra} - V_{EB})/R_{fa}$ $I_{ra} = V_{ra}/R_{Oa}$ $I_{ra} + [V_T \times \ln(a \times b)]/R_{ia} + I_{Rfa} \approx 0$ Thus, $V_{ra}/R_{Oa} + [V_T \cdot \ln(a \times b)]/R_{ia} + (V_{ra} - V_{EB})/R_{fa} \approx 0$ Solving for $V_{ra}$ in the above equation (with b=1), we therefore get:

$V_{ra} \approx [V_{EB} + (R_{fa}/R_{ia}) \times V_T \times \ln(a)] \times (1 + R_{fa}/R_{Oa})^{-1}$ The method of operation of the FIG. 1 embodiment may be summarized as follows. An $I_{PTAT}$ or $I_{Ria}$ is generated in the $Q_{2a}$–$R_{ia}$–$A_{1a}$–$Q_{1a}$ voltage loop via $\Delta V_{EB}$ of $Q_{2a}$–$Q_{1a}$ placed across $R_{ia}$, where $\Delta V_{EB} \approx V_{EB}|_{Q1a} - V_{EB}|_{Q2a} \approx V_T \times \ln(a \times b)$. Concurrently, the sum of currents at a circuit node (node 4a) are zero, meaning that $I_{Rf2a} + I_{Ria} + I_D|_{P2a} = 0$. Amplifier $A_{2a}$ accommodates the (unity gain) buffering and the feeding back of $V_{ra}$ on to $R_{f1a}$ and $R_{f2a}$. Hence, $I_{Rfa} \approx (V_{ra} - V_{EB})/R_{fa}$, which increases with temperature since $V_{ra}$ is designed to have near zero TC while $V_{EB}$ voltage decreases with temperature. Therefore, since $I_{RF2}$ which increases with temperature can provide the positive TC $I_{Ria}$, then (in order for $A_{1a}$ to keep its inputs substantially equal) amplifier $A_{1a}$ provides the gates of $P_{1a}$-$P_{4a}$ (current sources) with a voltage such that $P_{1a}$-$P_{4a}$ will have near zero TC currents. Thus, $I_D|_{P2a} \approx V_{ra}/R_{Oa}$ which is $I_{ra}$ and has a near zero TC.

To describe some of the benefits of this embodiment, an example may be helpful. Given that $V_{EB}$ has a –2 mV/° C., let us say $V_{EB}|_{T=cold}=0.8V$, $V_{EB}|_{T=ambient}=0.6V$, and $V_{EB}|_{T=hot}=0.4V$. The circuit is configured such that $V_{ra}|_{cold > T > hot}=0.6V$. Also note that current consumption of the FIG. 1 circuit embodiment can be in a predetermined range of for example 1 micro ampere to 5 micro amperes, depending on considerations such as die size and power consumption objectives amongst others.

Another benefit is that the current consumption at ambient temperature is minimized, and this is advantageous because some applications operate in ambient most of the time but need to withstand hot and cold temperature hikes sometimes. The current through $R_{f1a}$ and $R_{f2a}$ is nearly zero since the voltages across them are nearly zero: $V_{ra}|_{cold > T > hot}=0.6V=V_{EB}|_{T=ambient}=0.6V$. Note also that here the zero current crossing point can be set to the middle of hot and cold temperature.

Another benefit of the FIG. 1 embodiment is that the same amplifier $A_{2a}$ may be used to generate $I_{ra}$ and $V_{ra}$. Furthermore, $A_{2a}$ may be configured as a unity gain buffer amplifier which has some current output drive capability and can eliminate the need for an external amplifier for driving some output loads. Besides cost, an external amplifier can contribute to additional offset and gain error variation over temperature.

Conventional bandgaps (such as the one depicted in FIG. 5) as well as this proposed embodiment would require trimming for more precise TC. A trim for TC in the embodiment disclosed in FIG. 1 goes a longer way since both $I_{ra}$ and $V_{ra}$ values (with $A_{1a}$ to provide some voltage output drive capability) can be centered for optimal TC with the same single trim as opposed to multiple trims for each of $V_{ra}$, $I_{ra}$, and one to null-out the non-ideal effects of an external buffer amplifier.

Another advantage of the embodiment of FIG. 1 is that by programming different $R_{Oa}$, $R_{fa}$, or scaling $P_{1a}$-$P_{4a}$, different fractional bandgap voltages can be attained.

Another benefit of the FIG. 1 embodiment is that it also allows for decoupling of $V_{SS}$ and ground (GND), where technically $V_{SS}$ can run at a lower voltage than the ground potential. Note that $V_{DD}$ may be lowered to substantially similar value by which the $V_{SS}$ is lowered limited by the forward biasing of base-collectors of $Q_{1a}$ and $Q_{2a}$. Such capability of this embodiment can accommodate proper operations of the Bandgap reference at lower $V_{DD}$ while $V_{ra}$ remains referenced to the ground potential.

Supply voltage coefficient and bandgap's TC of this embodiment should also benefit from the circuit in FIG. 1 for at least 2 reasons: (1) there is more temperature stability associated with current sources $P_{1a}$-$P_{4a}$ which are biased with $V_{ra}/R_{Oa}$ which is a current with near zero TC; and (2) transistors $P_{3a}$-$P_{4a}$ drain voltages are centered near $V_{ra}$, which at the middle point of $P_{1a}$-$P_{2a}$ drain voltages that shift around $V_{ra}$ from 400 mV at hot temperatures to 800 mV at cold temperatures. This should minimize and help center systematic mismatch due to $V_A$ (early voltage of CMOS transistors) of PMOS transistors, and variations of $V_{ra}$ over $V_{DD}$ and temperature spans.

The embodiment of FIG. 1 further allows for stacking CMOS transistors to help enhance the output impedance of current sources $P_{1a}$-$P_{4a}$. Note also that $V_{ra}$ can be fed back through only one resistor $R_{f1a}$ to the $Q_{ia}$ side. Eliminating $R_{f2a}$ can save power and area at the expense of additional bow in TC.

Figure 2:
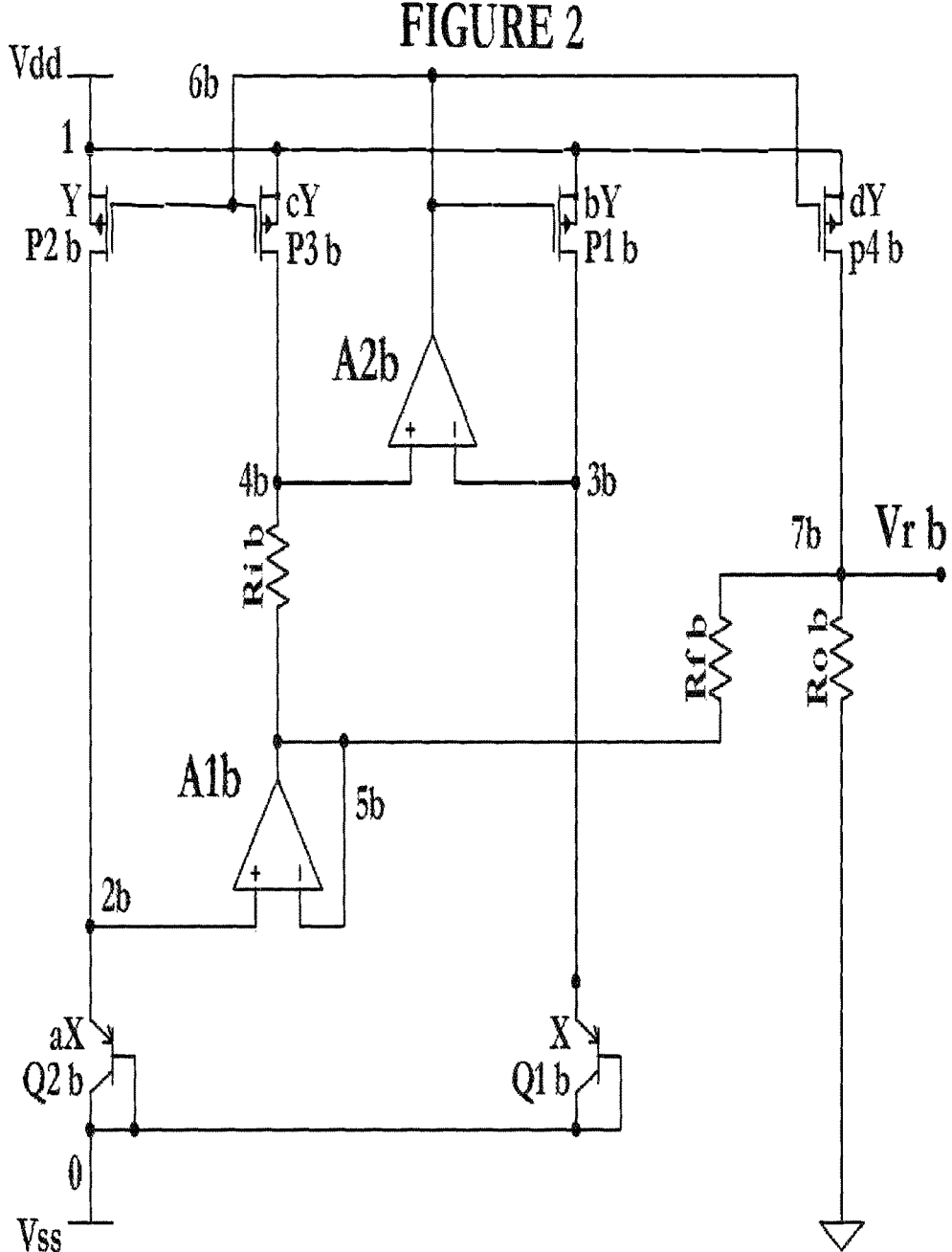
FIG. 2 is a schematic circuit diagram of second embodiment illustrating a bandgap (or fractional bandgap) in a voltage regulator circuit.
Figure 3:
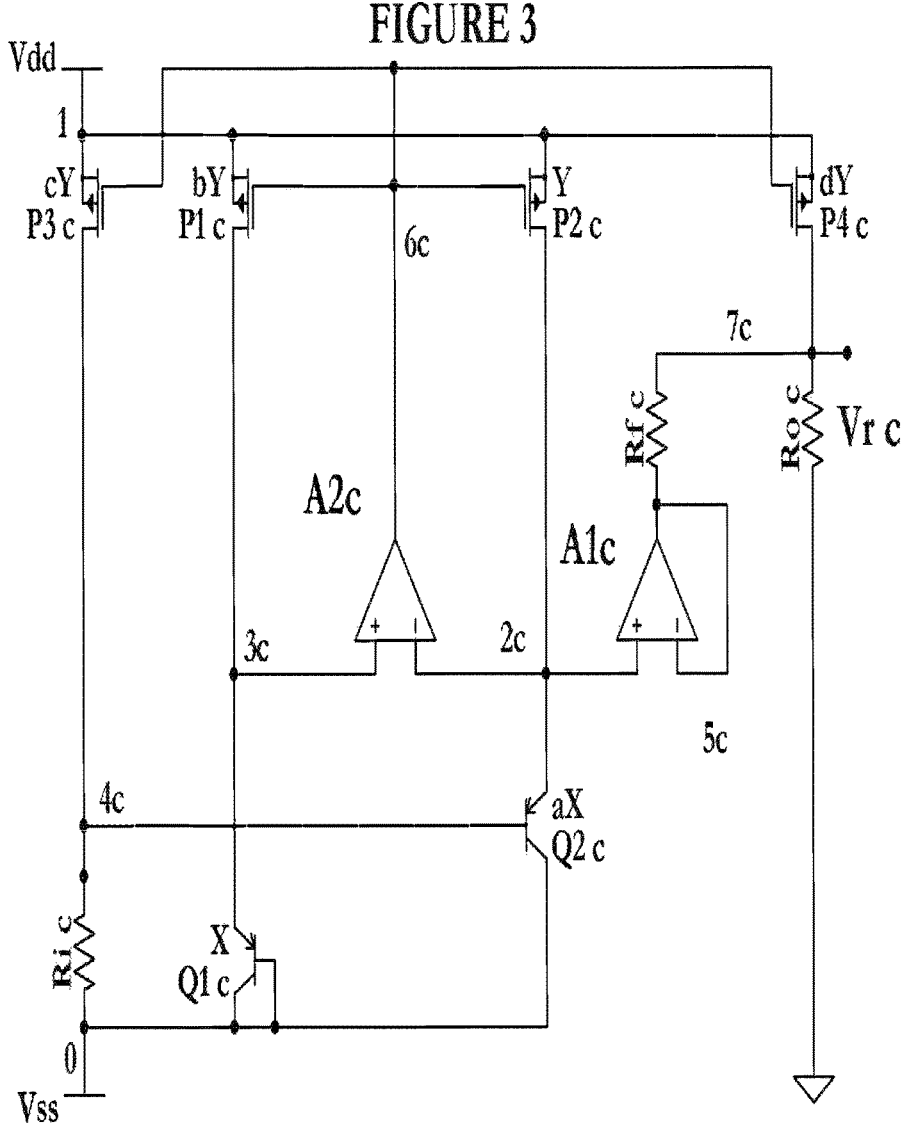
FIG. 3 is a schematic circuit diagram showing a third embodiment of an alternative bandgap reference to FIG. 2.

In the embodiments disclosed in FIGS. 2 and 3 a bandgap voltage, $V_{BG}$, is generated by adding a PTAT voltage, $V_{PTAT}$, whose voltage increases with temperature (positive TC) to a CTAT voltage, $V_{CTAT}$, whose voltage decrease with temperature (negative TC). Henceforth, summation of the $V_{CTAT}$ (with a negative TC) and $V_{PTAT}$ (with a positive TC) can be scaled via resistors (divider) to produce a fractional bandgap voltage, $V_{rb}$, which is substantially constant over temperature variation. To accomplish this objective in standard CMOS and in the context of low supply voltage and current, alternative embodiments are shown in FIG. 2 and another in FIG. 3. These embodiments include elements such as amplifiers, resistors, BJT, and CMOS transistors that can be configured to function as current sources. The embodiments of FIGS. 2 and 3 improve bandgap's cost-performance by maintaining low current consumption, keeping the bandgap operational at lower power supply, and maintaining stability over frequency while keeping the die size small to keep the cost down.

FIG. 2 is a circuit schematic showing a fractional bandgap reference. The embodiment depicted in FIG. 2 establishes a PTAT current ($I_{Rib}$) in $P_{3b}$ via forcing a $\Delta V_{EB}$ across $R_{ib}$, where $\Delta V_{EB}=V_T\times\ln(a\times b)$ which is a PTAT signal. Note that $Q_{2b}$ is 'a' times the size $Q_{1b}$, and $P_{1b}$ is 'b' times the size of $P_{2b}$. Amplifier $A_{1b}$ is configured in unity gain to set the voltage at one side of $R_{ib}$ to $V_{EB}$ of $Q_{2b}$. Conjointly, amplifier $A_{2b}$ substantially equalizes the voltage on the other side of $R_{ib}$ (by providing enough voltage to the gate of $P_{3b}$) with $V_{EB}$ of $Q_{1b}$. Therefore a voltage of $\Delta V_{EB} \approx V_{EB}|Q_{1b} - V_{EB}|Q_{2b}$ is generated across $R_{ib}$. The current $I_{Rib}=I_{PTAT}$ is properly scaled and mirrored in $P_{1b}$ through $P_{4b}$, where $P_{4b}$ feeds such scaled $I_{PFAT}$ to the output node at $V_{rb}$. In concert, a CTAT current $I_{Rfb}$ flows through $R_{fb}$, which is generated via the same $V_{EB}$ of $Q_{2b}$, after it is buffered by unity gain amplifier $A_{1b}$. The aggregation of the three currents $I_{Rfb}$, $I_{Rib}$, and $I_{ROb}$ at the output node 7b generates the desired $V_{rb}$. This embodiment segregates the quiescent currents of $Q_{1b}$-$Q_{2b}$-$P_{1b}$-$P_{2b}$ loops from the currents that flows through $R_{ib}$, $R_{fb}$, and $R_{Ob}$. Such implementation provides a needed flexibility in biasing $Q_{1b}$-$Q_{2b}$, including operating them at advantageously lower quiescent currents, to minimize the $V_{EB}$ voltage drop (without requiring prohibitively large $R_{ib}$ or $R_{fb}$ or $R_{Ob}$). This move, in turn can free up the scarce operational supply voltage headroom, especially in deep sub-µ CMOS sub-1V power supply environments, where every 10 s of mV counts. For example, lowering the quiescent current in the $Q_{1b}$ and $Q_{2b}$ BJTs from 10 pA to 5 nanoamperes (nA) lowers $V_{EB}$ by about 200 mV, which translates to gaining back about 20% of extra $V_{DD}$ supply headroom in sub-1V environments. By segregating low quiescent currents in $Q_{1b}$ and $Q_{2b}$ BJTs from the PTAT and CTAT signal loop, very large value resistors $R_{ib}$, $R_{fb}$, $R_{Ob}$ may be avoided (e.g. in the 10 MΩ+ range for currents in 10s of nA).

The connections of elements in FIG. 2 are now described. Transistors $P_{1b}$, $P_{2b}$, $P_{3b}$, and $P_{4b}$ have their source terminals connection to node 1 which is the positive supply voltage or $V_{DD}$. Transistors $P_{1b}$ through $P_{4b}$ have their gates connected to node 6b, whose voltage is set by the output node of amplifier $A_{2b}$. At node 3b, drain of $P_{1b}$ is connected to the emitter of BJT, $Q_{1b}$, as well as the inverting input terminal of amplifier $A_{2b}$. At node 2b, drain of $P_{2b}$ is connected with the emitter of BJT, $Q_{2b}$, as well as the non-inverting node of amplifier $A_{1b}$. At node 4b, drain of $P_{3b}$ is connected to resistor $R_{ib}$ as well as non-inverting input terminal of $A_{2b}$. At node 7b, which is the output of the reference voltage $V_{rb}$, drain of $P_{4b}$ is connected to resistor $R_{Ob}$ as well as resistor $R_{fb}$. The other side of $R_{Ob}$ is connected to ground (GND), which can be at a different voltage that $V_{SS}$ where base and collector terminals of $Q_{1b}$ and $Q_{2b}$ are connected to $V_{SS}$. At node 5b, $R_{ib}$ is connected to $R_{fb}$, which are connected to the output of $A_{1b}$. Note that at node 5b, amplifier $A_{1b}$ has its inverting input terminal connected to its output, which configures $A_{1b}$ as a voltage unity gain buffer amplifier, where the voltage at the non-inverting input of $A_{1b}$ is substantially equalized with the voltage its output at node 5b. Amplifier $A_{2b}$ is utilized here to substantially equalize its negative at node 3b with its positive input at node 4b. Setting the source voltages of transistors $P_{1b}$ through $P_{4b}$ to the same voltage at node 1b (which is $V_{DD}$) and setting their gates to the same voltage at node 6b enables configuring transistors $P_{1b}$ through $P_{4b}$ as four current sources whose quiescent currents can be scaled substantially proportional to their respective transistors' width over length ratios, W/L. For example, in the FIG. 2 circuit schematic $(W/L)_{P1b}=b\times(W/L)_{P2b}$, and $(W/L)_{P3b}=c\times(W/L)_{P2b}$, and $(W/L)_{P4b}=d\times(W/L)_{P2b}$, which accommodates scaling $P_{1b}$, $P_{3b}$, and $P_{4b}$ quiescent currents to be substantially scaled as multiples of 'b', 'c', and 'd' times the quiescent current in $P_{2b}$.

The details of various methods of operation of the circuit in FIG. 2 is described in the following segment. We begin by describing the voltage loop that starts (at node 0 which is the VSS) going through Q2b (to node 2b) then across $A_{1b}$ (to node 5b) then through Rib (to node 4b) then across A2b inputs (to node 3b) and finally through $Q_{2b}$ back to node 0. In this voltage loop, amplifiers $A_{1b}$ and $A_{2b}$ have substantially minimal offset voltages (note that $V_{EB}$ of Q is denoted as $V_{EB}|Q$)

$$V_{EB}|_{Q1b} \approx I_{PTAT} \times R_{ib} + V_{EB}|_{Q2b}, \text{ where } I_{PTAT} \approx I_{Rib}.$$

Thus: $V_{EB}|_{Q1b} - V_{EB}|_{Q2b} \approx I_{PTAT} \times R_{ib} \approx \Delta V_{EB}$.

Therefore, $$I_D|_{P3b} \approx I_{PTAT} \approx \Delta V_{EB}/R_{ib} \approx (V_{EB}|_{Q1b} - V_{EB}|_{Q2b})/R_{ib}$$

To generate $\Delta V_{EB}$, the emitter areas of $Q_{2b}$ are scaled 'a' times bigger than that of $Q_{1b}$, and as described earlier the quiescent currents for $Q_{1b}$ and $Q_{2b}$ can be scaled via $P_{2b}$ and $P_{1b}$ currents, whose W/Ls are scaled by 'b':

$$\Delta V_{EB} \approx V_{EB}|_{Q1b} - V_{EB}|_{Q2b} \approx V_T \times \ln(a \times b).$$

Thus:

$$I_D|_{P3b} \approx I_{PTAT} \approx \Delta V_{EB}/R_{ib} \approx [V_T \times \ln(a \times b)]/R_{ib}.$$

Note for example that for a=5 and b=11, then 100 mW≈VT× ln(55) could be a typical value of [V$_T$×ln (a×b)] term in the above equation. Consistent with principles of conventional bandgaps (such as the one depicted in prior art FIG. 5), note that $\Delta V_{EB}$ tracks V$_T$ which has a positive TC, and this yields the PTAT signal (current) needed in the bandgap.

Next is a summary of what has been described thus far about the FIG. 2 bandgap which pertains mostly to the operation of PTAT signal generation. Amplifier A$_{1b}$ (which is configured in unity gain with its inverting input connected to its output) operates as a buffer for V$_{EB}|_{Q2b}$ voltage to be fed to one side of R$_{ib}$. Concurrently, amplifier A$_{2b}$ senses the V$_{EB}|_{Q1b}$ at its inverting input and while the output of A$_{2b}$ generates the needed gate voltage for P$_{3b}$. Configured as such, transistor P$_3$ drain current feeds the other side of R$_{ib}$ in order for A$_{2b}$ to substantially equalizes its (inverting and non-inverting) inputs it to V$_{EB}|_{Q1b}$. Hence, the voltage across R$_{ib}$ is set to $\Delta V_{EB} = V_{EB}|_{Q1b} - V_{EB}|_{Q2b}$ which is a P$_{TAT}$ current or I$_{PTAT}$. As noted earlier, given that A$_{2b}$ drives the gates P$_{1b}$ through P$_{4b}$, whose sources are all connected to V$_{DD}$, then the quiescent current of P$_1$ through P$_4$ are also scaled (by 'b', 'c', 'd') as a function of I$_{PTAT}$, which has a positive temperature coefficient as stated earlier.

The circuit of FIG. 2 enables Q$_{1b}$ and Q$_{2b}$ quiescent currents to be scaled and track I$_{PTAT}$, which has a positive TC. An important benefit of this embodiment is that it also concurrently accommodates both Q$_{1b}$ and Q$_{2b}$ to operate at currents that are segregated (or isolated) from the current through R$_{ib}$. Such segregation results in feasible and meaningful design flexibility to scale the ratio ('n') of currents in R$_{ib}$ as compared to the quiescent currents in Q$_{1b}$ and Q$_{2b}$, to accommodate low voltage supply operations, which will be explained shortly. Since the current through R$_i$ is I$_{PTAT}$≈I$_D|_{P3}$, then the current through Q$_{1b}$ and Q$_{2b}$ can be I$_{PTAT}$/n. For example, the amount of I$_{PTAT}$ current through R$_{ib}$ can be typically in the 10 μA level, while because of the segregation, the amount of I$_{PTAT}$ current through BJTs Q$_{1b}$ and Q$_{2b}$ can be scaled down in the 5 nA levels, which make n=10 pA/5 nA=2000. In this example, by lowering quiescent currents of BJTs by 2000, then the V$_{EB}$ in Q$_{1b}$ and Q$_{2b}$ is lowered by V$_T$×ln (2000) which is about 200 mV. Having 100 mV to 200 mV less voltage across V$_{EB}$ in sub-1V power supply environments is about 10% to 20% of extra headroom, which is very beneficial for bandgap operations to specifications with lower power supplies. Also note that current consumption of the FIG. 2 circuit embodiment can be predetermined in the range of for example 0.5 micro ampere to 2 micro amperes, depending on considerations such as die size and power consumption objectives, amongst others.

Moreover, by segregating the Q$_{1b}$ and Q$_{2b}$ currents from R$_{ib}$, the circuit of FIG. 2 has another benefit which allows for small size R$_{ib}$ at very low currents. To make the point more clear a comparison with (such as the one depicted in FIG. 5) bandgaps may be helpful. As in the cases with ordinary bandgaps, R$_{ib}$ is generally in series with emitter of Q$_{2b}$, and in such schemes both R$_{ib}$ and Q$_{2b}$ quiescent currents must be the same or in the μA ranges. To reduce the V$_{EB}$ of Q$_{2b}$, its quiescent current needs to be substantially reduced. For example, if one were to design for $\Delta V_{EB}$=100 mV and 5 nA of quiescent current through both R$_{ib}$ and Q$_{2b}$, then that would require a 20 MΩ resistor which is size prohibitive.

Instead, this embodiment allows for $\Delta V_{EB}$=100 mV across R$_{ib}$ with current of 10 μA which makes R$_{ib}$=10 KΩ which is very feasible and economical. In this example, therefore 2000 times smaller resistor and 20% extra headroom for sub-1V power supply environment is achieved. Area and headroom benefits less than 2000 and 20% (respectively) would make using the embodiment in FIG. 2 worth the while.

Now we turn to describing the CTAT and fractional voltage generation of this embodiment. The fractional bandgap voltage or V$_{rb}$ at node 7b is provided with (1) the PTAT signal, which is via the drain terminal of P$_{4b}$ feeding the equivalent parallel resistors R$_{Ob}$ and R$_{fb}$, and (2) the CTAT signal, which unity gain amplifier A$_{1b}$ feeds the resistor divider of R$_{Ob}$ and R$_{fb}$. The method to arrive at the fractional bandgap voltage is described as follows. The sum of currents at node 7b must equal zero. In other words, I$_D|_{P3b}$+I$_{ROb}$+I$_{Rfb}$=0. Note that I$_D$ of P$_{3b}$ is denoted as I$_D|_{P3b}$. Transistor P$_{4b}$ is a current source, whose current is a function of I$_{PTAT}$ with a positive TC. If scale factors c=d then (W/L)$_{P3b}$=(W/L)$_{P4b}$ causes, I$_D|_{P3b}$=I$_D|_{P4b}$. We showed earlier that:

$$I_D|_{P4b} \approx I_D|_{P3b} \approx I_{PTAT} \approx [V_T \times \ln(a \times b)]/R_{ib}$$

Moreover, at node 7b it can be seen that I$_{ROb}$=V$_{rb}$/R$_{Ob}$ and I$_{Rf}$=(V$_{EB}$−V$_r$)/R$_f$. Given that I$_D|_{P3}$+I$_{RO}$+I$_{Rf}$=0, therefore the simplified mathematical solution for V$_{rb}$ can be described as:

$$V_{rb} \approx V_{BG} \times (1 + R_{fb}/R_{ob})^{-1}$$

$$\approx (m \times V_T + V_{EB}) \times (1 + R_{fb}/R_{ob})^{-1}$$

$$\approx [(R_{fb}/R_{ib}) \times V_T \times \ln(a \times b) + V_{EB}] \times (1 + R_{fb}/R_{ob})^{-1}.$$

Note for example that for a=5 and b=11, then 100 mV≈VT× ln(55) could be a typical value of V$_T$×ln (a×b) term in the above equation. Note that in the equation above, V$_{EB}$ generates the CTAT voltage, which is added to that PTAT voltage (m×V$_T$) to generate a V$_{BG}$, where 'm' is a constant set by designing the proper scale factors in (a×b) and R$_{fb}$/R$_{ib}$. Production yields are significantly optimized when specifications depend on constants such as 'm' that are derived from ratios of transistor sizes. As just described in this embodiment, manufacturing yields are not compromised here because the V$_{BG}$ and V$_{rb}$ terms depend on 'a' which is the ratio of sizes of Q$_{1b}$ and Q$_{2b}$, and 'b' which is the ratio of W/L of P$_{1b}$ and P$_{2b}$, and R$_{fb}$/R$_{ib}$ and R$_{fb}$/R$_{ob}$ which are the ratios of 2 resistors.

An example to describe the ratio of transistor and resistors sizes for this embodiment is presented. As noted earlier, a typical value of V$_{EB}$ of a particular parasitic BJT device in a CMOS process is +0.6V with TC of −2 mV/° C. The value of V$_T$ is about +25.8 mV with TC of +0.086 mV/° C. To generate a voltage that has a near zero TC, 'm' needs to be set at a multiple of 23.25, which is derived from ratio of TC of V$_{EB}$ (−2 mV mV/° C.) to TC of V$_T$ (+0.086 mV/° C.). Hence, V$_{BG}$≈m.V$_T$+V$_{EB}$≈1.2V. Moreover, by choosing R$_{fb}$=R$_{Ob}$, then a fractional V$_{rb}$ voltage of V$_{BG}$/2 or 0.6V can be produced, which is desirable in sub-1V power supply applications.

Recall that the PTAT signal is generated while current through R$_{ib}$ is segregated from quiescent current through Q$_{2b}$, in order to keep V$_{EB}$ low and resistor sizes feasible. Similarly, this embodiment enables generating the CTAT signal from the same V$_{EB}$ of Q$_{2b}$ where the quiescent current in Q$_{2b}$ is segregated from the current through R$_{fb}$ via the same amplifier A$_{1b}$ which is configured as a unity gain buffer amplifier. As was the case in the PTAT signal path, here in the CTAT signal path, there is a material benefit in segregating $Q_{2b}$ from $R_{fb}$, where normal currents (e.g. in the ρA levels) can run through $R_{fb}$ in order to keep the size of $R_{fb}$ small for optimal die cost, while running current through $Q_{2b}$ very small (e.g. in the nA levels) to keep $Q_{2b}$ $V_{EB}$ low and hence improve power supply headroom for sub-1V application. Note that unity gain amplifier buffer $A_{1b}$ segregates $Q_{2b}$ (which operate at very low currents) from $R_{fb}$ by sinking and sourcing current changes in $R_{fb}$ (as $V_{rb}$ is kept constant while $V_{EB}$ of $Q_{1b}$ decreases with temperature) where $R_{fb}$ currents are 'n' times higher that $Q_{2b}$ quiescent currents. As such one of the additional benefits of this embodiment is that the same $V_{EB}$ of $Q_{2b}$ plays a central part in generating the CTAT and PTAT signals which improves manufacturing reliability.

Figure 5:
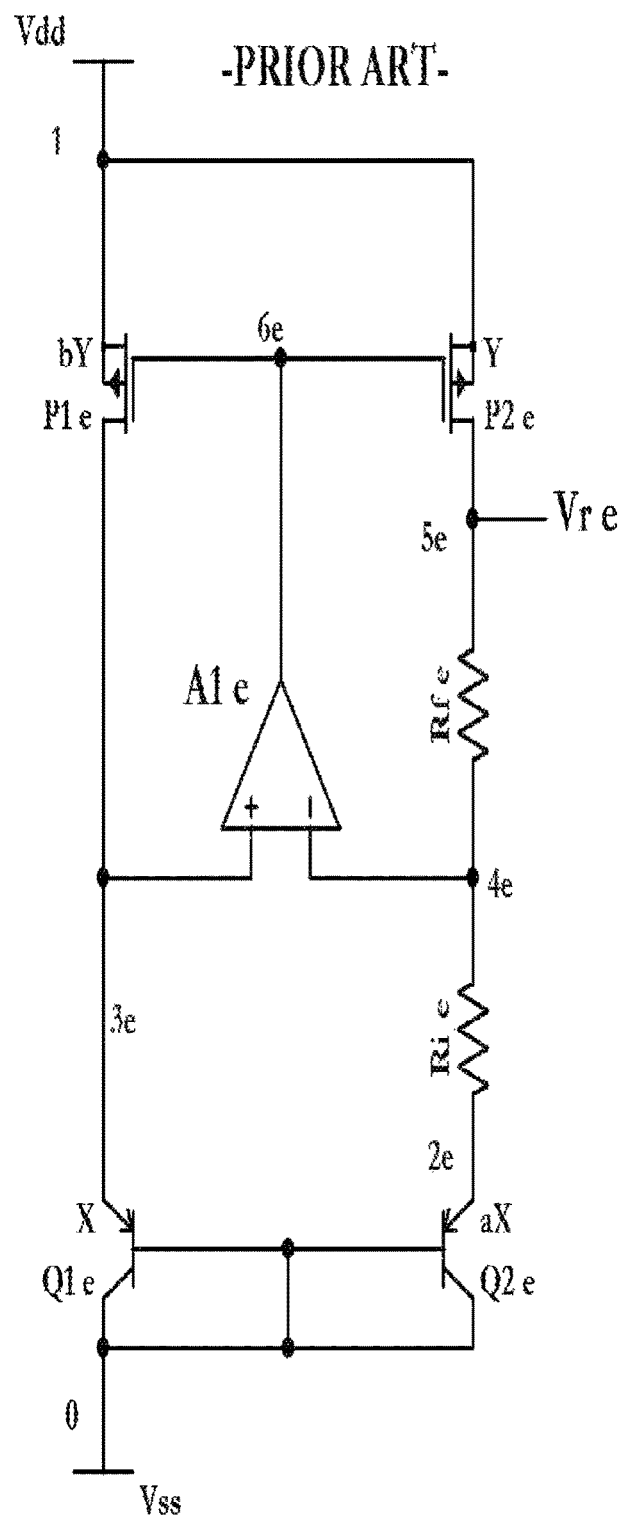
FIG. 5 is a circuit schematic showing a prior art conventional bandgap reference.

The embodiment of FIG. 2 has an additional benefit which is a more stable frequency response when compared with conventional bandgaps (such as the one depicted in FIG. 5 which require a large size $R_{ib}$ in series with emitter of $Q_{2b}$). By operating the currents in the nano-ampere level, $P_{2b}$ and $P_{1b}$ operate in subthreshold, where PMOS transistors behave like pseudo-BJTs. Therefore, current sources $P_{1b}$ and $P_{2b}$ (which behave like pseudo BJTs) provide the quiescent currents for BJTs $Q_{1b}$ and $Q_{2b}$. As such, small signal frequency response in $P_{2b}$-$Q_{2b}$ and $P_{1b}$-$Q_{ib}$ signal paths would depend on and track $V_T/I_{BIAS} \approx 1/g_m$, and will largely not depend on the segregated $R_{ib}$, which would have otherwise interfered with frequency response as is the case with conventional bandgaps (such as the one depicted in FIG. 5). Moreover, because $I_{BIAS}$ of $P_{2b}$-$Q_{2b}$ and $P_{1b}$-$Q_{ib}$ transistors are scaled as a multiple of $I_{PTAT}$ with a positive TC, their frequency response would also track to be more stable over temperature variations.

Another benefit of FIG. 2 embodiment is that it also allows for decoupling of $V_{SS}$ and ground (GND), where technically $V_{SS}$ can run at a lower voltage than the ground potential. Note that $V_{DD}$ may be lowered to substantially similar value by which the $V_{SS}$ is lowered limited by the forward biasing of base-collectors of $Q_{1b}$ and $Q_{2b}$. Such capability of this embodiment can accommodate proper operations of the Bandgap reference at lower $V_{DD}$ while $V_{rb}$ remains referenced to the ground potential.

The inclusion of the second amplifier in both FIGS. 2 and 3 will negatively contribute to higher noise and higher offset. Including the offset and noise (simplifying the equation to $V_{OFNS} \sim V_{OFFSET} + V_{NOISE}$ as an example) of the amplifiers in the $V_{rb}$ equation can be approximated as follows:

$$V_{rb} \approx [(R_{fb}/R_{ib}) \times V_T \times (\ln(a)) + V_{EB}] \times (1 + R_{fb}/R_{ob})^{-1} + [R_{fb}/R_{ib}] \times (V_{OFNS1} + V_{OFNS2}) - V_{OFNS2}] \times (1 + R_{fb}/R_{ob})^{-1}.$$

However, this impact on noise and offset is minimal and manageable by the embodiment of FIG. 2. Firstly, although $Q_{1b}$ and $Q_{2b}$ BJT's noise contribution increases with lowered currents, noise is generally dominated by the CMOS section (amplifiers and current sources) and not the BJTs. Secondly, the multi-billion dollar annual investments in the manufacturing of CMOS fabrication processes, over the last few decades, has significantly improved devise matching, noise, and offset performance which will also benefit this embodiment. Thirdly, the manufacturing yield impact due to the second amplifier offset is minimal. This is explained as follows. For demonstrative simplicity let us assume that identical amplifiers $A_{1b}$ and $A_{2b}$ have similar $V_{offset}$, and that b=c=1 and $R_{ob}$=$R_{fb}$. Statistically, the contribution of amplifiers $A_{1b}$ and $A_{2b}$ random inaccuracies (non-systematic and random offset voltage, noise, and drift) in the PTAT loop ($Q_{1b}$-$A_{1b}$-$R_{ib}$-$A_{2b}$-$Q_{1b}$) follow the square root of sum of squares of such random effects. As such, employing an extra amplifier, $A_{1b}$, should not statistically translate to doubling the impact of amplifier's noise and offset on the $V_{rb}$ output. That is the statistical contribution of amplifier offset voltage ($V_{ofs}$) could approximately be as follows:

$$[\sqrt{2}(R_{fb}/R_{ib})-1] \times V_{ofs}.$$

FIG. 3 is a circuit schematic showing a third embodiment which is an alternative bandgap reference to FIG. 2. Here, the voltage loop consisting of $R_{ic}$, $Q_{2c}$, $A_{1c}$, and $Q_{1c}$ forces a difference $V_{EB}$, or $\Delta V_{EB}$, voltage to be placed across $R_{ic}$. The current $\Delta V_{EB}/R_{ic}$ is the $I_{PTAT}$ current that is mirrored via $P_{3c}$ onto $P_{1c}$, $P_{2c}$ and $P_{4c}$. Concurrently, $V_{EB}$ of $Q_{2c}$ feeds $R_{fc}$, which constitutes the CTAT signal. Similarly, note that $Q_{2c}$ is 'a' times the size of $Q_{1c}$ and $P_{1c}$ is 'b' times the size of $P_{2c}$. In FIG. 3, the PTAT signal through $P_{4c}$ and CTAT signal through $R_{fc}$ are then summed and scaled at the $V_{rc}$ node, by the ratio of $R_{fc}$ and $R_{Oc}$ to generate the desired fractional $V_{BG}$. With $R_{ic}$ connected to base of $Q_{2c}$ to ground, the PTAT current through $R_{ic}$ (e.g. in the ρA level) is segregated from the quiescent current in the $Q_{1c}$ and $Q_{2c}$ BJTs (e.g. in the nA level). Running currents in $R_{1c}$, $R_{fc}$, $R_{Oc}$ at normal currents allows for small size resistors which save die costs, while concurrently running $Q_{1c}$ and $Q_{2c}$ at very low currents reduces $V_{EB}$ voltage of $Q_{1c}$ and $Q_{2c}$ which helps operating the fractional bandgap at lower power supply voltage.

The connections of elements in FIG. 3 will now be described. Given the commonalities between embodiments of FIG. 2 and FIG. 3, descriptions of circuit operations and benefits that overlap between them and that have been covered in the section for FIG. 2 are not discussed in detail. Transistors $P_{1c}$, $P_{2c}$, $P_{3c}$, and $P_{4c}$ have their source terminals connection to node 1 which is the positive supply voltage or $V_{DD}$. Transistors $P_{1c}$ through $P_{4c}$ have their gates connected to node 6c, whose voltage is set by the output node of amplifier $A_{2c}$. At node 3c, drain of $P_{1c}$ is connected to the emitter of BJT, $Q_{1c}$, as well as the inverting input terminal of amplifier $A_{2c}$. At node 2c, drain of $P_{2c}$ is connected with the emitter of BJT, $Q_{2c}$, as well as the non-inverting node of amplifier $A_{1c}$ plus the non-inverting node of amplifier $A_{2c}$. At node 4c, drain of $P_{3c}$ is connected to resistor $R_{ic}$ as well as the base terminal of BJT transistor $Q_{2c}$. At node 7c, which is the output of the reference voltage $V_{rc}$, drain of $P_{4c}$ is connected to resistor $R_{Oc}$ as well as resistor $R_{fc}$. The other side of $R_{Oc}$ is connected to ground (GND), which can be at a different voltage than $V_{SS}$ when base and collector terminals of $Q_{1c}$ and $Q_{2c}$ are connected to $V_{SS}$. At node 5c, $R_{fc}$ is connected to the output of amplifier $A_{1c}$ which is configured in unity gain (functioning as a voltage buffer) with its inverting input connected to its output. Amplifier, $A_{2c}$ is utilized here to substantially equalize its negative at node 3c with its positive input at node 4c. Setting the source voltages of transistors $P_{1c}$ through $P_{4c}$ to the same $V_{DD}$ voltage at node 1c and setting their gates to the same voltage at node 6c enables configuring transistors $P_{1c}$ through $P_{4c}$ as four current sources. Here, $P_{1c}$-$P_{4c}$ quiescent currents can be scaled substantially proportional to their respective transistors' width over length ratios, W/L. For example, in the FIG. 3 circuit schematic $(W/L)_{P1c}$=b×$(W/L)_{P2c}$, and $(W/L)_{P3c}$=c×$(W/L)_{P2c}$, and $(W/L)_{P4c}$=d×$(W/L)_{P2c}$, which accommodates scaling $P_{1c}$, $P_{3c}$, and $P_{4c}$ quiescent currents to be substantially scaled by 'b', 'c', and 'd' times the quiescent current in $P_{2c}$.

The details of various methods of operation of the circuit in FIG. 3 is described in the following segment. We begin by describing the voltage loop that starts (at node 0) going through $R_{ic}$ (to node 4c) then over $Q_{2c}$ (to node 2c) then across $A_{2c}$ (to node 3c) then across $Q_{2c}$ back to node 0. To describe operation of this voltage loop, amplifiers $A_{1c}$ and $A_{2c}$ will have substantially minimal offset voltages:

$$I_{PTAT} \times R_{ic} + V_{EB}|_{Q2c} \approx V_{EB}|_{Q1c}, \text{ where } I_{PTAT} \approx I_{Ric}.$$

Thus: $V_{EB}|_{Q1c} - V_{EB}|_{Q2c} \approx I_{PTAT} \times R_{ic} \approx \Delta V_{EB}$.

Therefore, $$I_D|_{P3c} \approx I_{PTAT} \approx \Delta V_{EB}/R_{ic} \approx (V_{EB}|_{Q1c} - V_{EB}|_{Q2c})/R_{ic}$$

$$\Delta V_{EB} \approx V_{EB}|_{Q1c} - V_{EB}|_{Q2c} \approx V_T \times \ln(a \times b).$$

Hence:

$$I_D|_{P3c} \approx I_{PTAT} \approx \Delta V_{EB}/R_{ic} \approx [V_T \times \ln(a \times b)]/R_{ic}.$$

Note for example that for a=5 and b=11, then 100 mV≈VT×ln(55) could be a typical value of [$V_T$×ln (a×b)] term in the above equation. Let us summarize what has been described thus far about embodiment of the FIG. 3 bandgap, which pertains mostly to the operation of PTAT signal generation. Amplifier $A_{2c}$ substantially equalizes its inputs, which are connected to emitters of $Q_{1c}$ and $Q_{2c}$, by way of $A_{2c}$'s output driving $P_{3c}$'s gate. Transistor $P_{3c}$, configured as such, provides enough current via its drain terminal to the top of $R_{ic}$ which produces a voltage at node 4c that is equal to the difference voltage between $V_{EB}$ of $Q_{1c}$ and $V_{EB}$ of $Q_{2c}$. In summary, the voltage across $R_{ic}$ is set to $\Delta V_{EB} = V_{EB}|_{Q1c} - V_{EB}|_{Q2c}$ which is a $P_{TAT}$ current or $I_{PTAT}$. As noted earlier, given that $A_{2c}$ drives the gates $P_{1c}$ through $P_{4c}$, whose sources are all connected the $V_{DD}$, then the quiescent current of $P_{1c}$ through $P_{4c}$ are also scaled (by 'b', 'c', 'd') as a function of $I_{PTAT}$, which has a positive temperature coefficient as stated earlier.

As was the case with the embodiment in FIG. 2, the embodiment in FIG. 3 has the important benefit of segregating $Q_{1c}$ and $Q_{2c}$ to operate at very low currents compared to the current that flows through $R_{ic}$. Since current through $R_{ic}$ is $I_{PTAT} \approx I_D|_{P3c}$, then the current through $Q_{1c}$ and $Q_{2c}$ can be $I_{PTAT}/n$. By lowering quiescent of BJTs by 'n', then the $V_{EB}$ in $Q_{1c}$ and $Q_{2c}$ is lowered by $V_T \times \ln(n)$, which can be in the range of 150 mV to 200 mV. Having 150 mV to 200 mV less voltage across $V_{EB}$ in sub-1V power supply environments is about 15%-20% of extra headroom, which is very beneficial for bandgap operations to specifications with lower power supplies. Also note that current consumption of the FIG. 3 circuit embodiment may be a predetermined value for example in the range of 500 nano amperes to 2 micro amperes, depending on considerations such as die size and power consumption objectives amongst others.

Note that In this embodiment, the error due to BJT's low β (e.g. in the 1-5 range) is attenuated by 'n' or $I_{Ric}/I_{Q2c}$ ratio, where $IR_{Ric}$ is the current through $R_{ic}$ (the PTAT resistor), and $I_{Q2c}$ is the quiescent current through $Q_{2c}$ BJT.

Similar to the operational principles of FIG. 2, in the embodiment of FIG. 3, by segregating the $Q_{1c}$ and $Q_{2c}$ currents from $R_{ic}$, another benefit is realized which is keeping size of $R_{ic}$ small despite $Q_{1c}$ and $Q_{2c}$ very low currents.

Now we turn to describing the CTAT and fractional voltage generation of this embodiment. Amplifier $A_{1c}$, configured as a unity gain buffer amplifier functions to segregate $V_{EB}$ of $Q_{2c}$ which operates in nano-ampere current levels (a CTAT signal) and $A_{1c}$ functioning as a buffer to absorb the sink and source currents through $R_{fc}$ which operates with micro ampere levels. As stated earlier, this is beneficial because the same $V_{EB}$ of $Q_{1c}$ is used to generate CTAT and PTAT signals, $V_{EB}$ of $Q_{1c}$ is kept low to help operations at lower $V_{DD}$, and keep resistor $R_{fc}$ size small by running normal current levels through it.

The method to arrive at the fractional bandgap voltage is described as follows. The sum of currents at node 7c must equal zero. For c=d we get $I_D|_{P3c} = I_D|_{P4c}$. Moreover, at node 7c it can be seen that $I_{ROc} = V_{rc}/R_{Oc}$ and $I_{Rfc} = (V_{EB} - V_{rc})/R_{fc}$. Similar to the principle of operations in FIG. 2, for the embodiment in FIG. 3 we also have $I_D|_{P3c} + I_{ROc} + I_{Rfc} = 0$, therefore the simplified mathematical solution for $V_{rc}$ can be described as:

$$V_{rc} \approx V_{BG} \times (1 + R_{fc}/R_{oc})^{-1}$$

$$\approx (m \times V_T + V_{EB}) \times (1 + R_{fc}/R_{oc})^{-1}$$

$$\approx [(R_{fc}/R_{ic}) \times V_T \times \ln(a \times b) + V_{EB}] \times (1 + R_{fc}/R_{oc})^{-1}.$$

As previously discussed, to get optimal manufacturing fabrication yields, it is best to have performance specification depend on geometric ratios of devices available in the fabrication process. Here also, manufacturing yields are not compromised because the $V_{BG}$ and $V_{rc}$ terms depend on 'a' which is the ratio of sizes of $Q_{1c}$ and $Q_{2c}$, and 'b' which is the ratio of W/L of $P_{1c}$ and $P_{2c}$, and $R_{fc}/R_{ic}$ and $R_{fc}/R_{oc}$ which are resistor ratios.

Similarly to FIG. 2, the embodiment of FIG. 3 has an additional benefit which is a more stable frequency response, when compared with conventional bandgaps (such as the one depicted in FIG. 5 which require a large size $R_{ic}$ in series with emitter of $Q_{2c}$). Also, a similar benefit of FIG. 3 embodiment is that it also allows for decoupling of $V_{SS}$ and ground (GND), where technically $V_{SS}$ can run at a lower voltage than the ground potential. Note that $V_{DD}$ may be lowered to substantially similar value by which the $V_{SS}$ is lowered limited by the forward biasing of base-collectors of $Q_{1c}$ and $Q_{2c}$. Such capability of this embodiment can accommodate proper operations of the Bandgap reference at lower $V_{DD}$ while $V_{rb}$ remains referenced to the ground potential.

For similar reasons discussed earlier, contribution in noise and offset due to lower currents and the extra amplifier are mitigated when compared to conventional bandgaps (such as the one depicted in FIG. 5).

As noted earlier, the risk and error due to BJT's low β (e.g. in the 1-5 range) is attenuated by 'n' or $I_{Ric}/I_{Q2c}$ ratio. However, in certain CMOS fabrication processes where the base leakage current of parasitic BJTs ($Q_{2c}$ which connected to $R_{ic}$) can derail high temperature accuracy. For such fabrication cases, the embodiment of FIG. 2 may be a more rugged solution.

Figure 4:
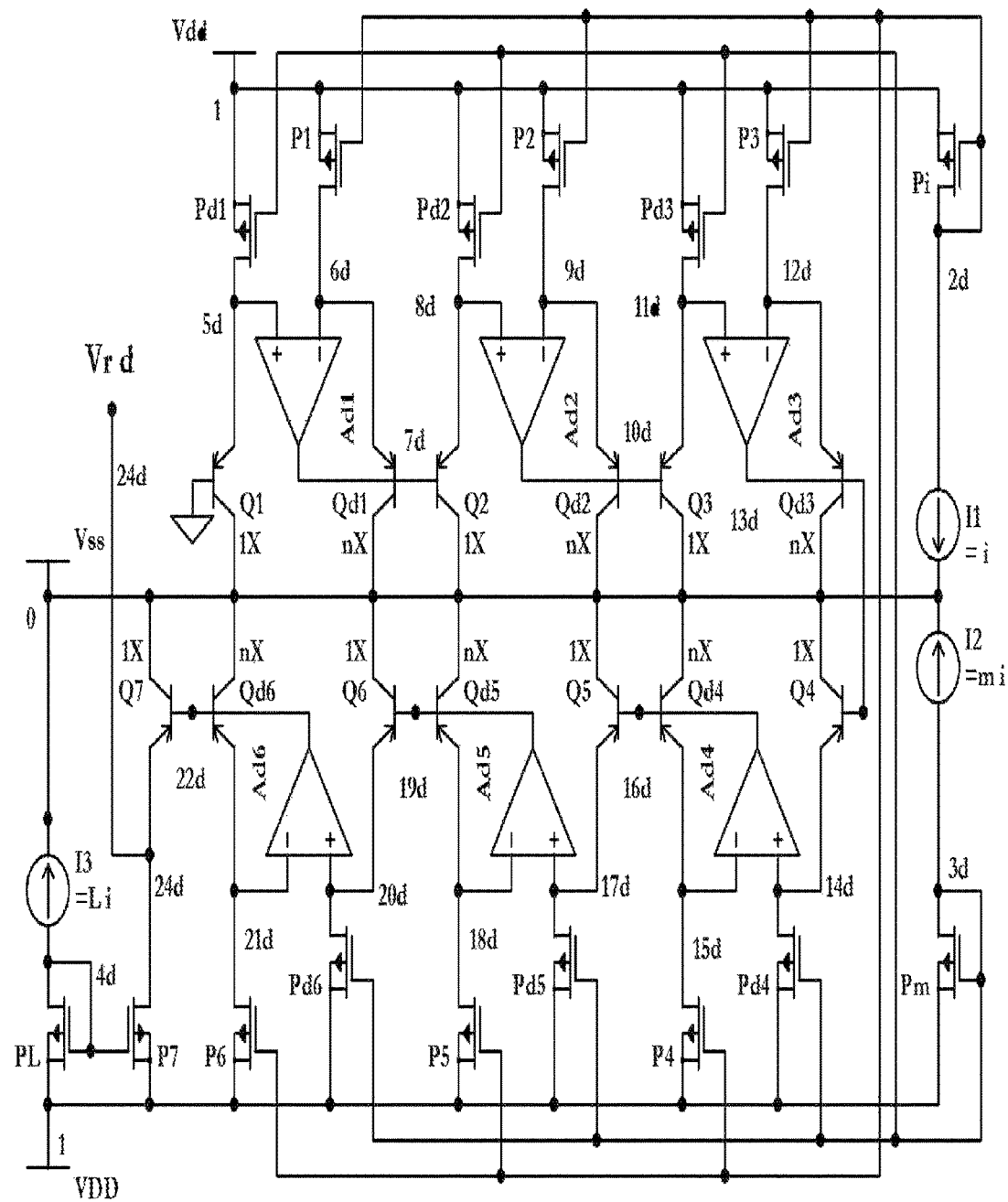
FIG. 4 is a schematic circuit diagram showing a bandgap reference according to a fourth embodiment.

The embodiment disclosed in FIG. 4 enables ultra low currents while preserving optimal performance, manufacturing quality, and low costs. Operating at ultra low currents generally requires large size resistors, which can occupy large die areas and thus cost more. Generally, BJT based references that generate a bandgap voltage yield more quality performance, and typically CMOS (non-BJT, non-bandgap) based references that yield ultra-low currents are resistorless. Hence, making large size bandgaps with high value resistors (as in FIG. 5) that have reasonable quality, or making resistorless references (that are not bandgap-based) that may have sub-par quality are two of the conventional approaches to realize ultra low power references. In FIG. 4 note that the circuit diagram consists of elements such as amplifiers, resistors, BJT, and CMOS transistors (i.e. PMOS transistors can be configured to operate as current sources).

The embodiment in FIG. 4 is ultra low power and it is different, among other things, in that it does not use resistors and is bandgap based. A summary of the description on FIG.

4 embodiment is first provided. Parasitic BJTs (such as $Q_1$ and $Q_{d1}$) are used to generate a multiple of a thermal voltage, which is $V_T \ln (n \times m) = \Delta V_{EB} =$ (such as $V_{EB}|Q_1 - V_{EB}|Q_2$). Such multiple of $V_T$ is then duplicated in series a proper number of times to generate a PTAT voltage and then added in with a $V_{EB}$ (or CTAT voltage) to produce a 1.25 v bandgap voltage. Cascading scaled parasitic BJT $V_{EB}$ followers looped-in with CMOS amplifiers (that have no built in offset), depicted in the embodiment in FIG. 4 offers some advantages. For example, it helps keep current consumption ultra-low and parasitic leakages minimized which can extend the higher temperature span of operation. Operating headroom is maximized in part because of lowered $V_{EB}$ and $V_{GS}$ of CMOS and BJT transistor, which operate in nano-ampere currents levels. Importantly, this embodiment eliminates use of resistors without the need for any special device or process. Such a bandgap can operate at ultra-low currents (i.e. nano-amperes) without using (large size) resistors and without compromising frequency response stability which saves significant die area and improves frequency response in ultra-low currents. This embodiment may be implemented only using standard CMOS processes and may not require any custom or special devices and hence lowers manufacturing cost. Also, importantly, manufacturing yields should improve with this embodiment because statistical (random) contributions from CMOS amplifier noise, offset, and drift terms are not multiplied but accumulated by the square root of sum of the squares, fundamentally because the proposed topology uses summation and not multiplication to generate the bandgap's PTAT term.

FIG. 4 is a circuit schematic showing a bandgap reference according to another embodiment of this invention. Let us start by describing the connections of elements in FIG. 4 with the PTAT signal generation section first. Transistor $P_i$, biased at current 'i', has its gate and drain connected to node 2d, which biases equal sized PMOS transistors $P_1$, $P_2$, $P_3$, $P_4$, $P_5$, and $P_6$ to also be biased at current 'i'. Current source PMOS transistors $P_1$ through $P_6$ have their sources connected to node 1, which is $V_{DD}$, and have their drains connected to nodes 6d, 9d, 12d, 15d, 18d, and 21d respectively, which feeds the emitter of nX BJT PNPs in each of $V_T$ cell. Specifically, collectors of BJTs $Q_{d1}$, $Q_{d2}$, $Q_{d3}$, $Q_{d4}$, $Q_{d5}$, and $Q_{d6}$ are connected to $V_{SS}$ and their emitters are connected to nodes 6d, 9d, 12d, 15d, 18d, and 21d respectively, which bias the emitter currents of each of nX BJT PNP to about 'i'. Similarly, transistor $P_m$, biased at current 'm×i' has its gate and drain connected to node 3d, which biases equal sized PMOS transistors $P_{d1}$, $P_{d2}$, $P_{d3}$, $P_{d4}$, $P_{d5}$, and $P_{d6}$ to also be biased at current 'm×i'. Current source PMOS transistors $P_{d1}$ through $P_{d6}$ have their sources also connected to node 1, which is $V_{DD}$, and have their drains connected to nodes 5d, 8d, 11d, 14d, 17d, and 20d respectively, which feeds the other BJT emitter of 1×PNPs in each of $V_T$ cell. Collectors of BJTs $Q_1$, $Q_2$, $Q_3$, $Q_4$, $Q_5$, and $Q_6$ are connected to $V_{SS}$, while their emitters are connected to nodes 5d, 8d, 11d, 14d, 17d, and 20d respectively, which biases the emitter currents of each of the 1×BJT PNP to about 'm×i'. Amplifiers $A_{d1}$, $A_{d2}$, $A_{d3}$, $A_{d4}$, $A_{d5}$, and $A_{d6}$ have their non-inverting inputs connected to nodes 5d, 8d, 11d, 14d, 17d, and 20d respectively, and have their inverting nodes connected to nodes 6d, 9d, 12d, 15d, 18d, and 21d respectively. The output nodes of amplifiers $A_{d1}$, $A_{d2}$, $A_{d3}$, $A_{d4}$, $A_{d5}$, and $A_{d6}$ are connected to nodes 7d, 10d, 13d, 16d, 19d, and 22d respectively. While the base of $Q_1$ is connected to ground (GND); bases of $Q_{d1}$ and $Q_2$ are connected to node 7d; bases of $Q_{d2}$ and $Q_3$ are connected to node 10d; bases of $Q_{d3}$ and $Q_4$ are connected to node 13d; bases of $Q_{d4}$ and $Q_5$ are connected to node 16d; bases of $Q_{d5}$ and $Q_6$ are connected to node 19d; and finally bases of $Q_{d6}$ and $Q_7$ are connected to node 22d.

A '$V_T$ cell' is comprised of current source transistors $P_{d1}$ and $P_1$ which bias emitters of $Q_1$ and $Q_{d1}$, respectively, while amplifier $A_{d1}$ generates a voltage at node 7d such that its inputs at nodes 5d and 6d are substantially equalized. Because $Q_{d1}$ is 'n' times larger in emitter size than that of $Q_1$ and because $Q_1$ is biased at 'm' times higher current than $Q_{d1}$, then the difference between $V_{BE}$s of $Q_1$ and $Q_{d1}$ is $\Delta V_{BE} = V_T \ln (n \times m)$. This $\Delta V_{BE}$ is the multiple of thermal voltage, $V_T$, that '$V_T$ cell' number 1 generates at node 7d. Therefore, $V_T$ cell 1 is made up of transistors $P_{d1}$ and $P_1$ and amplifier $A_{d1}$; $V_T$ cell 2 is made up of transistors $P_{d2}$ and $P_2$ and amplifier $A_{d2}$; $V_T$ cell 3 is made up of transistors $P_{d3}$ and $P_3$ and amplifier $A_{d3}$; $V_T$ cell 4 is made up of transistors $P_{d4}$ and $P_4$ and amplifier $A_{d4}$; $V_T$ cell 5 is made up of transistors $P_{d5}$ and $P_5$ and amplifier $A_{d5}$; and $V_T$ cell 6 is made up of transistors $P_{d6}$ and $P_6$ and amplifier $A_{d6}$.

$V_T$ cells number 1 to 6 each generate a $\Delta V_{BE} = V_T \ln (n \times m)$, which are configured in a series cascade that yields $6 \times V_T \ln(n \times m)$, which is the PTAT voltage. Note for example that for n=5 and m=11, then 100 mV≈VT×ln(55) could be a typical VT cell output voltage. Moreover, note that number of $V_T$ cells may be in the range of 5 to 8 depending on 'L', 'm', and 'n' scale factors that can be optimized for current consumption and area objectives on the bandgap.

The CTAT signal generation is simple and generated by $Q_7$. Transistor $P_L$, biased at current 'L×i' has its gate and drain connected to node 4d, which biases equal sized PMOS transistor $P_7$. This transistor's drain terminal at node 24d supplies the bias current for emitter of $Q_7$ that has it collector connected to $V_{SS}$. BJT $Q_7$ generates the $V_{EB}$ which is the CTAT voltage.

Next is a summary of the description of the FIG. 4 embodiment and a discussion of the impact of non-ideal terms such as CMOS amplifier offset voltages. The proposed $V_T$ cell approach depicted in FIG. 4 entails generating a PTAT voltage through 2 parasitic vertical PNP pairs looped by a small CMOS amplifier that operates in subthreshold which constitute '$V_T$ Cells'. Cascading multiples (i.e., G) stages of such '$V_T$ cells' generates the $V_{PTAT}$ (without utilizing resistors), which is added to a $V_{EB}$ at the last (or first) stage to produce the bandgap voltage, $V_{BG}$.

It is commonly known that non-ideal terms of CMOS amplifiers, such as $V_{OFS}$, dominate as compared to BJT non-ideal terms such as that of $V_{EB}$ follower pairs. Hence, $V_{BG}$ is can be approximated as follows:

$$V_{rd} \approx V_{BG} \approx V_{EB} + V_{OFS\text{-}total} + G \times [V_T \times \ln(n \times m)]$$

$$V_{OFS\text{-}total} \approx (\pm V_{OFSd1} \pm V_{OFSd2} \pm \ldots \pm V_{OFSdG}).$$

The random statistical contribution of the CMOS $V_{OFS}$ summed in series along within the $V_T$ cell can be approximated as:

$$V_{OFS\text{-}total} \approx [(\pm V_{OFSd1})^2 + (\pm V_{OFSd2})^2 + \ldots + (\pm V_{OFSdG})^2]^{1/2}$$

Given that CMOS amplifiers are geometrically identical and may be situated next to each other on the same die, the statistical variations of $V_{OFSd1}$ through $V_{OFSdG}$ should fall within a similar statistical band, let's say $V_{OFS}$. As such the statistical contribution of CMOS amplifier $V_{OFS}$ to the final bandgap voltage may be approximated as:

$$V_{OFS\text{-}total} \approx \sqrt{(G \times V_{OFS}^2)} \approx V_{OFS} \times \sqrt{G}$$

$$V_{rd} \approx V_{BG} \approx V_{EB} + V_{OFS} \times \sqrt{G} + G \times [V_T \times \ln(n \times m)].$$

CMOS amplifier $V_{OFS}$ in subthreshold (which is where all CMOS transistors of FIG. 4 are under) approximates $V_T$ like variations (thus tracking the VT ln [m×n] term by first order approximation), which can be corrected as part of the $V_{PTAT}$ wafer level trim (trim considerations will be described shortly). For comparison sake, it is of note that in conventional bandgaps (such as the ones in prior art FIG. 5) random statistical contribution of non idealities of CMOS amplifier $A_{1e}$, including $V_{OFSe1}$, is amplified by G+1 (G=$R_{fe}/R_{ie}$) instead of $\sqrt{G}$:

$$V_{ref} \approx V_{BG} \approx V_{EB} + G \times (1 + R_{fe}/R_{ie})[V_{OFSe1} + V_T \times \ln(n \times m)]$$

Therefore the embodiment of FIG. 4 (for a gain of, for example, 6), from a die yield perspective, the $V_{OFS}$ statistical contribution should be 2.4 times (or 6/$\sqrt{6}$) less than a conventional bandgap of FIG. 5 (for a gain of 6). Note that the benefit of the embodiment in FIG. 4 should extend in lieu of the same mathematics being applicable to other random non-ideal terms of CMOS amplifier such noise and drift. Another operational benefit of FIG. 4 embodiment should be higher temperature spans. CMOS amplifier input noise and offset voltage is generally lower with larger W/L of especially input transistors. However, because the statistical contribution of CMOS amplifier offset voltage in FIG. 4 is attenuated by $\sqrt{G}$, then CMOS transistors can be designed with smaller W/L and (as importantly) equally sized transistors inside each $V_T$ cell to improve high-temperature performance. Hence, small and (as importantly) equally sized CMOS transistors inside each $V_T$ cell amplifier maximize the bandgap's operating temperature span via balancing smaller (transistor) junction areas but large enough for reasonable matching which could contain the derailing impact of leakage currents particularly at high temperatures. Another benefit of the FIG. 4 embodiment is that BJTs and small CMOS amplifiers operate in subthreshold (low $V_{EB}$ and $V_{GS}$) so as to optimize bandgaps operating headroom.

Here is more specific descriptions pertaining to the advantages of the resistor-less bandgap of FIG. 4. Standard CMOS process offers gate-poly resistors with resistivity typically in the tens of Ω/square (□) (Ω is the symbol for resistivity and □ denotes unit area). For example, 700 mV (of $V_{PTAT}$ voltage) for every 100 nA of current flow (translate to a 7 MΩ resistor) which is area prohibitive with gate-poly resistivity in the tens of Ω/□. There are second layer poly (i.e. salicided and un-salicided) that offer resistance in the hundreds to thousands Ω/□, but they require extra manufacturing process steps that increase die cost, and also they are less accurate compared to first gate-poly. Also note that current consumption of FIG. 4 circuit embodiment may be a predetermined value for example in the range of 100 nano amperes to 500 nano amperes, depending on considerations such as die size and power consumption objectives amongst others.

Another important benefit of the embodiment of FIG. 4 being resistor-less, is better frequency response stability when compared with conventional CMOS bandgaps or variations such as FIG. 5. Frequency response of the loop containing $A_{1e}$ in conjunction with $P_{1e}$ and $P_{2e}$ can be made stable, but it is inherently challenged because, in the $A_{1e}$, $P_{1e}$, $P_{2e}$ signal loop, $P_{1e}$ and $P_{2e}$ small signals (from node 6e to nodes 4e and 3e) are both inverted and fed back to the inverting and non-inverting node of $A_{1e}$. When bias currents are ultra-low and $R_{ie}$ extra-large (i.e. by making a low current bandgap by utilizing the extra mask with higher resistivity poly, which is in the thousands of Ω/□), the frequency response stability of a FIG. 5 type configuration becomes even more challenging to mange for stability. The embodiment of FIG. 4 is inherently more stable, even in ultra-low currents, because it uses no resistors and it has no such $A_{1e}$, $P_{1e}$, $P_{2e}$ loop.

The embodiment of FIG. 4 can offer quality and performance advantages of BJT based bandgaps, it can also have an approximate die area that is in the ball park of other resistor-less references, fabricated in typical sub-micron CMOS processes, as indicated in the referred literature. As noted earlier, small W/L and ultra-low currents of amplifiers transistors have unfavorable noise impact on the bandgap. However, just one bigger compensation capacitor ($C_C$, which can be made by a CMOS transistor with its source and drain shorted) may be used in the last stage of the amplifier chain to further low-pass filter out the noise.

Bandgap references are fundamental budding blocks that are used almost in every electronic device. The embodiments disclosed in FIGS. 1-4 of this application may be used in personal computers, cell phones, consumer electronic, audio, automotive, test, imaging, video, defense, and medical electronics. These are some of the systems (but not limited to) that generally use bandgap references. The embodiments disclosed in FIGS. 1-4 may be used as a stand alone function (chip), part of a SOC (system-on-a chip), part of a hybrid (multi-chip), or in an electronic system such as a cell-phone. The embodiments disclosed in FIGS. 1-4 may also be used in applications such as power-on-a-chip (PoC), battery-less & wireless, and Internet-of-things (IoT) which are emerging applications that require very low voltage, very low current, high performance, and low costs (obtainable in standard CMOS fabrication processes).

As described above in the embodiment of FIG. 1 and method thereof, an output voltage ($V_{ra}$) and $V_{BE}$ are used to generate and feedback a current that supplies a needed positive temperature coefficient (TC) current to the bandgap's PTAT current loop. Such positive TC feedback current facilitates generating the residual near zero TC current which is concurrently fed-forward to an output resistor ($R_{OA}$) to produce the voltage reference ($V_{ra}$).

As described above in the embodiment of FIGS. 2 and 3 and methods thereof, by segregating and scaling currents (by n-times) in the BJTs from resistors in a bandgap voltage reference, area is saved and operating current minimized. Scarce power supply head room in sub-1V applications is freed-up in the PTAT loop from $V_{EB}$ by VT×ln (n).

As described above in the embodiment of FIG. 4 and method thereof, without use of resistors, bandgap voltage is generated by adding $V_{EB}$ to a PTAT voltage (G×$V_T$), where G $V_T$ is produced by cascading pairs of scaled $V_{EB}$ differential followers (with a built-in offset voltage which is a function of $V_T$) looped-in with small CMOS amplifiers (that have no built in offset) for ultra low currents that keeps parasitic leakage current contained, optimizes operating supply and temperature spans.

In summary, bandgap families disclosed in this application enable the bandgap's operations with (combination levels of) ultra-low power and low supply voltage and with the capacity to deliver optimal temperature and power supply spans.

The invention claimed is:

1. A method for generating a scaled bandgap reference voltage (VSR) comprising:
   providing a positive and negative power supply voltage to a proportional to absolute temperature (PTAT) circuit loop having a first transistor that operates at a first current, a second transistor that operates at a second current and a first resistor (RPTAT) that operates at a third current;

operating the proportional to absolute temperature (PTAT) circuit loop so that the first current of the first transistor and the second current of the second transistor are different from the third current operating through the first resistor (RPTAT) by isolating RPTAT from the first and second transistors in the PTAT circuit loop;

generating a scaled bandgap reference voltage (VSR) by supplying a first terminal of a second resistor with a fourth current that is scaled with the third current operating through the RPTAT, while supplying a second terminal of the second resistor with a ground signal; and supplying a complementary to absolute temperature (CTAT) signal to a first terminal of a third resistor while coupling the scaled bandgap reference voltage (VSR) to a second terminal of the third resistor.

* * * * *